(12) United States Patent
Gregory et al.

(10) Patent No.: US 7,849,752 B2
(45) Date of Patent: Dec. 14, 2010

(54) METHOD AND SYSTEM FOR PASSIVE WIRELESS STRAIN GAUGE

(75) Inventors: Otto Gregory, Wakefield, RI (US); John Conkle, Encinitas, CA (US); Jeffrey C. Shaw, Escondido, CA (US); Thomas Birnbaum, Santa Cruz, CA (US)

(73) Assignee: Argon ST, Inc., Fairfax, VA (US)

( * ) Notice: Subject to any disclaimer, the term of this patent is extended or adjusted under 35 U.S.C. 154(b) by 112 days.

(21) Appl. No.: 12/289,306

(22) Filed: Oct. 24, 2008

(65) Prior Publication Data

US 2009/0188324 A1    Jul. 30, 2009

Related U.S. Application Data

(60) Provisional application No. 60/960,997, filed on Oct. 24, 2007.

(51) Int. Cl.
*G01B 7/16* (2006.01)
(52) U.S. Cl. .......................... 73/773; 73/760
(58) Field of Classification Search ............ 73/760–860
See application file for complete search history.

(56) References Cited

U.S. PATENT DOCUMENTS

| | | | |
|---|---|---|---|
| 4,888,558 A * | 12/1989 | Hereikson | 329/345 |
| 6,622,567 B1 | 9/2003 | Hamel et al. | |
| 6,697,024 B2 * | 2/2004 | Fuerst et al. | 343/711 |
| 6,729,187 B1 | 5/2004 | Gregory | |
| 6,810,750 B1 * | 11/2004 | Kiefer et al. | 73/801 |
| 6,850,315 B1 | 2/2005 | Euler et al. | |
| 7,137,952 B2 * | 11/2006 | Leonardi et al. | 600/398 |
| 2005/0017864 A1 * | 1/2005 | Tsoukalis | 340/539.12 |

OTHER PUBLICATIONS

Allen, M.G., et al., "2.2.3.2: Passive Wireless Sensors," 2006 NASA/DoD UAPT Program Review, Florida A&M University, Tallahassee, Florida, Oct. 10-12, 2006, pp. 1-28.
Townsend, Christopher, et al. "Remotely powered, multichannel, microprocessor based telemetry systems for smart implantable devices and smart structure," 1999, Available at: <http://www.microstrain.com/white/spie_99_biotelem.pdf>.

* cited by examiner

*Primary Examiner*—Max Noori
(74) *Attorney, Agent, or Firm*—Duane Morris LLP

(57) ABSTRACT

A system and method of using a passive wireless gauge to detect the physical properties on an object.

15 Claims, 21 Drawing Sheets

METHOD AND SYSTEM FOR PASSIVE WIRELESS STRAIN GAUGE

This application claims the benefit of U.S. Provisional Application No. 60/960,997 filed Oct. 24, 2007.

The present disclosure is directed to the field of mechanical property sensing of an object using a gauge that can be read through a wireless connection. The mechanical property may relate to the deformation of an object. In a specific embodiment, the present disclosure includes a very small passive wireless strain gauge that translates strain to electrical capacitance, and then to a frequency shift in an RF carrier such that strain can be measured on surfaces typically found in hostile and inaccessible environments. It is useful in applications such as measuring the strain on a blade in a turbine engine where wired gauges are not practical or accessible.

BACKGROUND

A strain gauge is a device used to measure mechanical deformation of an object. The most common type of strain gauge consists of a flexible backing which supports a metallic foil pattern. As the object is deformed, the foil pattern is deformed, causing its electrical resistance to change and this resistance change is correlated with the extent of deformation. The active strain element does not have to be in foil form but can also be a wire or a (metallic) thin film. Although the present application describes the disclosure mostly in reference to a strain gauge, the principles discussed herein are equally applicable to sensing other properties related to deformation, including shear, torsion, and other static properties.

Strain gauges are used for measuring strain in a surface. One of the most common uses of strain gauge technology is to verify if an object or a component has deformed to the same extent as predicted under a preset load or stress level. Strain gauges are useful for experimental stress analysis and the experimental results are usually compared with those results established from finite element analysis software and other simulation tools such as ANSYS or ABAQUS.

Current strain gauge technologies include electrical resistance strain gauges (which employ wires, foils or thin films), capacitance strain gauges, fiber optic or optical strain gauges and variations of these. Resistance strain gauges applied to engine components such as blades and vanes are usually accessed using slip ring technology or telemetry systems and the signals are brought to this hardware using wires encased in an Inconel sheath.

Optical strain gauges can exhibit significantly greater sensitivity than traditional metal foil strain gauges, are light weight and easily manufactured, and are easily incorporated into optical fiber data collection/distribution systems. Fiber optic strain sensors are a popular way to monitor structures, since several very long optical fibers can be used to gather distributed strain and temperature data from many points over very large structures. Optical strain sensors can be fragile, and require a physical connection to measure data.

A large amount of prior art exists describing various types of strain gauges including resistance-based using flexible backing with metallic or wire. Typically, foil or wire strain gauges have figures of merit or gauge factors (G) on the order of 2-4. Semiconductor gauges have gauge factors that are typically 1-2 orders of magnitude greater than metal foil gauges. A measure of the responsiveness or strain sensitivity of resistance strain sensors is given by the gauge factor (G), which is defined according to the equation below $$G = \frac{\Delta R}{R} * \frac{1}{\varepsilon}$$

where R is the electrical resistance, $\Delta R$ is the change in resistance and $\varepsilon$ is the applied microstrain.

Strain gauges must be properly attached to the surface to be tested to accurately measure strain. In the gas turbine engine environment, adhesion is a major issue since the gas velocities can approach 1000 ft/sec and the "g" forces acting on the strain gauges attached to blades or discs are extreme under typical rotating conditions. Attachment using adhesives, etc. is therefore problematic, making thin film sensors very attractive from this viewpoint. Thin film strain sensors are well suited to make direct physical measurements on turbine components in harsh environments and thus, assess the mechanical behavior of these components during actual engine operation, so that structural models can be validated and newly developed materials evaluated. Thin film sensors are non-intrusive in that the gauge thickness is considerably less than the gas phase boundary layer thickness and thus, the gas flow path through the engine will not be adversely affected by these sensors. Thin film sensors have negligible mass and thus are not affected by the large "g" forces acting on the blades.

Current strain gauge technologies include electrical resistance strain gauges (which employ wires, foils or thin films), capacitance strain gauges, fiber optic or optical strain gauges and variations of these. Resistance strain gauges applied to engine components such as blades and vanes are usually accessed using slip ring technology or telemetry systems and the signals are brought to this hardware using wires encased in an Inconel sheath. Wire strain gauges employed in the hot sections of gas turbine engines are usually imbedded in a ceramic coating. Typically these gauges are imbedded in a sprayed ceramic coating (thermal spray instrumentation) which is applied to a MCoCrAlY bond coat for adhesion purposes. The wires are affixed to the sprayed ceramic surface coating and an additional layer of ceramic is deposited over the wire instrumentation in effect forming an imbedded sensor element. The foil gauges are usually actually with a backing or an adhesive to the substrate that is to be evaluated. This cannot be done for higher temperature applications due to adhesive issues, etc. and this approach is marginal at best even in the colder sections of engine. Since today's compressor blades are becoming thinner and thinner, the mass of the attached sensor itself (and associated bonding agents) can compromise the strain measurement by altering the various vibrational modes; i.e. their low mass will not affect the blade's balance. Since thin film strain gauges are deposited directly onto the substrate of interest without any adhesive, they are attractive from many viewpoints including adhesion, mass and durability.

Capacitance-based strain gauges operate in a similar manner to resistive strain gauges in that a change in strain is translated into a change in capacitance (vs. a change in resistance). The change in capacitance must be measured (generally in a powered circuit) and communicated to an external device or system for use (generally using a wired connection).

Current optical strain gauges can be classified as either intensity based (OSG) or interference based (FBG). The Fiber Bragg grating (FBG) strain sensors employ a grating in the solid fiber and a shift in wavelength of the reflected light off the grating is correlated with the amount of strain in the fiber. The intensity based OSG relies on a hollow capillary glass-tube with specialized thin film coatings on the outside surface to attenuate and reflect the light launched into the tube from an optical fiber source. A second fiber, at the other end of the tube, carries the attenuated light beam to a detector. The amount of attenuation is based on the bending of the tube, which affects both the angle of incidence and the number of bounces that various light rays experience while inside such a hollow wave-guide. The bending radius is, in turn directly related to the strain experienced by the tube and is transferred to the tube by the structural component to which it is affixed.

Suitable modifications of the surface coatings permit tailoring the gauge factor (G) to specific strain ranges. Hollow tube strain gauges have demonstrated gauge factors in the range from 100 to 300. Metal strain gauges, in contrast, have gauge factors in the range 2 to 4 and require some method of compensation if the ambient temperature changes. For the strain gauges of the intensity type described here, G~120, bending strains to 3000 µE (micro-strain) were readily monitored over a temperature range from −20° F. to 115° F. without requiring temperature compensation. As with a metallic strain gauges, a gauge factor can be defined as the change in intensity divided by the initial intensity per unit of strain.

$$G = \frac{1}{I_0} \cdot \frac{\Delta I}{\Delta \varepsilon}$$

While G thus defined is not constant for all strains, a range can be determined for each OSG, controlled by the absorptive layer, for which a linear approximation is valid. Indeed this is an advantage of the OSG, since the gauge factor can be tailored for a specific strain range. Optical strain sensors can be fragile, and require a physical connection to measure data.

There is limited existing art for wireless strain gauges. In one known configuration, the measurements from a strain gauge are transferred from the gauge via a wired connection or an fiber optic cable connection, and then connected to a wireless transmitter (such as an 802.11 node). This embodiment is not wireless under the definition used in this disclosure as the device must have an intermediate direct wired or fiber connection. As used in this disclosure a wireless strain gauge has not physical connection with the communication path that transfer the measurement from the gauge to the instrumentation that reads and interprets the measurement.

Another prior art system is described in U.S. Pat. No. 6,622,567 which refers to a system that has a strain gauge made up of a differentially variable reluctance transducer (resistance-based strain measurement) coupled with an RFID device. It describes an external reader that sends electromagnetic energy to the strain gauge/RFID that is used to temporarily provide power so that the gauge can make a strain measurement, and the RFID device and strain gauge can send signals back to the reader. This embodiment is different than the present disclosure in several ways. First, the strain measurement is made via a Wheatstone Bridge-based resistive measurement. Second, the patent describes an RFID device as an integral part of the invention. Third, the gauge/RFID device has active circuit elements that are powered by the reader-supplied electromagnetic energy. In contrast, the present disclosure utilizes a frequency shift induced single capacitive measurement, utilizes an interrogating RF signal which is transponded with encoded strain information, and all circuit elements in the strain gauge and associated microwave communications circuit are passive, and the device is never powered.

Another piece of relevant prior art is the work being done under the NASA/DoD UAPT program. This prior art describes approaches to "remote sense parameters in harsh environment using self packaged, passive wireless sensors." However, there are several significant differences between this prior art and the present disclosure including this prior art does not address strain gauges, uses different materials as the basis for the sensors than the materials disclosed herein, does not disclose a means for the implementing the transmitter/receiver/signal processor portion of the system and specifically does not provide a means for detecting and measuring the response signals in presence of the interrogation signals. This prior art is directed to magnetic loop-based antennas rather than electrical dipoles as described in the current disclosure.

Although remote sensing requires sensors that consume no or very low power for reading the sensor and transmitting the data, most prior art sensors require continuous energizing either for operation or for data transmission, and have required substantial power supplies. For example, a paper, "Multichannel Strain Gauge Telemetry for Orthopaedic Implants," by G. Bergmann, et al., J. Biomechanics Vol. 21 no. 2 pp 169-176, 1988, describes remote powering of a Wheatstone bridge with active strain gauges that require continuous power. A paper, "Remotely powered, multichannel, microprocessor based telemetry systems for smart implantable devices and smart structures," by Christopher Townsend, et al, described an implantable sensor telemetry system that uses low power microprocessors integrated circuits, Wheatstone bridge signal conditioning, and a remote powering system. The Wheatstone bridge has advantage in providing temperature compensation. However, the bridge circuit also requires a continuous voltage and flow of current, so substantial energy is eventually used. "Capacitive Sensors Design and Applications," by L. K. Baxter, IEEE Press, 1997, shows a microcontroller providing a train of pulses or a microcontroller providing a single interrogation pulse to excite a capacitive limit switch. However, the circuit described by Baxter does not provide a way to measure more than the two positions of the capacitor and does not compensate for changes in temperature.

Fiber optic strain sensors are a popular way to monitor structures, since several very long optical fibers can be used to gather distributed strain and temperature data from many points over very large structures. However, these sensors require expensive equipment for monitoring and acquiring data. They also require special care during installation to prevent fiber breakage during the construction process. Fiber optic connectors, which allow the embedded fibers to egress from the structure in order to be interrogated by external equipment, adds to construction costs and to the difficulty of sensor installation. Furthermore, like previously described systems, they also require power, which can fail at critical moments, such as during a violent storm when important data needs to be collected.

Conventional bonded foil strain gauges are subject to drift due to delamination of their bond to the structure under test over time, and with exposure to moisture. Considerable surface preparation of the structure, and exotic coating steps are required in order to maintain reasonable short-term recordings from a bonded gauge to be exposed to the environment. More stable vibrating wire strain gauges are typically welded to the structure under test, but these welds may cause localized corrosion It is important to note that neither bonded nor vibrating wire strain gauges in the existing art include a way to passively detect peak displacements or strains.

The prior art gauges discussed above are the general purpose type used in most operating environments. However, these strain gauges may not be suitable in harsh environments such as with the turbine blades. Currently, wire connected indium-tin-oxide (ITO) based resistive sensors are used for strain measurements in turbine engines. As an object is deformed, the active strain element usually a resistor element is deformed, causing its electrical resistance to change and this resistance change is correlated with the extent of deformation. In the ITO sensors the electrical resistance of the ITO changes with strain due to the Poisson contraction (geometrical effect) as well as a strain induced resistivity effect (common to semiconductor strain elements). The change in electrical resistance of the active strain element is monitored using wires that are eventually connected to a slip ring or telemetry system and then to the outside world. These electrical devices require wires to get the signal from the engine environment to the data acquisition system for data collection and analysis. The ITO sensors have much larger gauge factors and thus don't suffer from the low signal to noise ratios that plague slip ring technology. The piezoresistive response of semiconductor gauges similar to the ITO gauge described here, depends largely on the changes in band structure as the semiconductor is deformed. This is in contrast to the metal/alloy based strain sensors where changes in dimension of the active sensor element due to straining are responsible for changes in electrical resistance. Thus, the piezoresistive response of ITO based strain sensors is 1-2 orders of magnitude greater than those observed in metals. However, all of these sensors require lead wires to take the signal from the sensor to the outside world and this makes the measurement expensive and cumbersome, even with the larger gauge factors possible with the ITO based strain sensors. Therefore, techniques such as passive wireless strain gauge that can eliminate the use of slip rings are attractive from the viewpoint of cost and complexity of the measurement. The implication here is that potentially every blade could be instrumented and the possibility of engine health monitoring would then be feasible which brings a whole new dimension to aviation maintenance and safety. These are the main advantages of the gauge disclosed here as compared to the existing resistance strain gauges being used by the industry today.

One of the merits of the thin film strain gauges being developed today for the turbine section of engines is their high temperature capability. Thin film strain gauges based are being developed to measure static and dynamic strain at temperatures approaching 1500° C. These ceramic strain gauges exhibit excellent oxidation resistance and high temperature stability, surviving tens of hours of strain testing at temperatures as high as 1530° C. in air.

Ceramic strain gauges based on reactively sputtered indium tin oxide thin films have been developed over the past ten years to monitor the structural integrity of components employed in propulsion systems that operate at temperatures in excess of 1500° C. This has been largely accomplished using microstructural control during the fabrication of the thin film ceramic sensors and is the subject of a recent patent. Here the microstructure of the ITO strain sensors consisted of a contiguous network of indium tin oxide (ITO) particles with well-defined necks between the individual ITO particles. These ITO films were prepared by sputtering in various nitrogen/oxygen/argon partial pressures to incorporate large amounts of nitrogen into the films. Under these conditions, sintering and densification of the ITO particles containing these nitrogen rich grain boundaries were retarded and a contiguous network of nano-sized ITO particles was established. The enhanced electrical conduction along the surfaces of these contiguous ITO particles resulted in a very stable and large piezoresistive response with a gauge factor of 22 and a drift rate of 0.0001%/hour at temperatures as high as 1575° C.

In addition to the stabilization of the ITO strain sensors to very high temperatures, novel temperature compensation techniques have been implemented over an extended temperature range. This includes the placing of noble metal resistors in series with the ITO strain sensors to form a self-compensated ceramic strain gauge that exhibit extremely low TCR's from room temperature to 1400 C (U.S. Pat. No. 6,729,187). Other techniques are also being developed to reduce the TCR of the ITO gauges even further, which is the subject matter of another recent patent. All of these technologies are important to improving the signal to noise ratio of these resistance strain gauges, which must ultimately rely on slip ring technology to get the signal from the sensor to the data acquisition system.

Prior art optical strain gauges are generally not suitable for operating at high temperatures since the diffraction grating (Bragg grating) must be stable (no diffusion effects). The current silica based glass fibers will not work at high temperatures and alternative solid fibers must be utilized. Therefore, some high temperature work has been attempted using sapphire fibers as the active elements in the FBG optical strain gauges. Intensity based optical sensors (OSG) have been developed for low temperature applications but are still under development for high temperature applications as well. The sensors are based on a hollow capillary glass-tube with specialized refractory thin film coatings on the outside surface to attenuate and reflect the light launched into the tube from an optical fiber source. A second fiber, at the other end of the tube, carries the attenuated light beam to a detector.

The amount of attenuation is based on the bending of the tube, which affects both the angle of incidence and the number of bounces that various light rays experience while inside such a hollow wave-guide (U.S. Pat. No. 6,850,315).

None of the current strain gauge technologies are ideally suited to measure strain in turbine engines, especially under normal operating conditions. All current technologies exhibit some attribute shortcoming that prevents effective and efficient strain measurement.

This disclosure describes a strain gauge and accompanying instrumentation system that overcomes prior art limitations. This disclosure describes a passive microwave circuit that both measures strain and converts the measurement to an RF signal that can be accessed and used outside of the turbine engine without a physical connection. The thin, low mass microwave circuit is deposited or attached directly on the engine fan blade without materially affecting the blades balance or the engine gas flow and can operate in the harsh physical environment internal to a turbine propulsion engine. A novel transponder circuit and external transmitter/receiver/processor provides the interrogation, response and signal processing to estimate the mechanical strain from the RF signal.

DETAILED DESCRIPTION

The characteristics of gas turbine engines are well known in the art, as is the requirement to measure strain in the blade sets that operate in engine. Whether the engine is used for propulsion (i.e. jet engine) or power generation or any other purpose, there is a need to monitor the mechanical integrity of the device.

Turbine engines are composed of a number of bladed discs used for different purposes in the operation of the engine. The mechanical integrity of these blades (or blisks) is critical to the operation of the engine, and therefore it is extremely useful to be able to efficiently and accurately measure strain in the blades during the life cycle of the engine.

The present disclosure is directed to a strain gauge for use in harsh environments, such as for use with turbine blades having the following characteristics:

Small size such that it appears "mass-less" on the blade; does not perturb the vibration modes in the blades Thin such that the thickness is considerable less than the gas phase boundary layer thickness so that gas flow through the engine is not adversely affected Rugged such that it can withstand the harsh environments found in a turbine engine & the gauge-to-the blade attachment mechanism remains reliable Passive such that it remains small in size and exhibits high availability (no power supply failures or maintenance)

Sufficient "gauge factor" such that mechanical strain changes are translated into a measurable quantity (such as resistance change) with enough magnitude that strain changes can be accurately determined Convenient measurement access interfaces such that strain measurements can be communicated outside of the engine for analysis.

Figure 1:
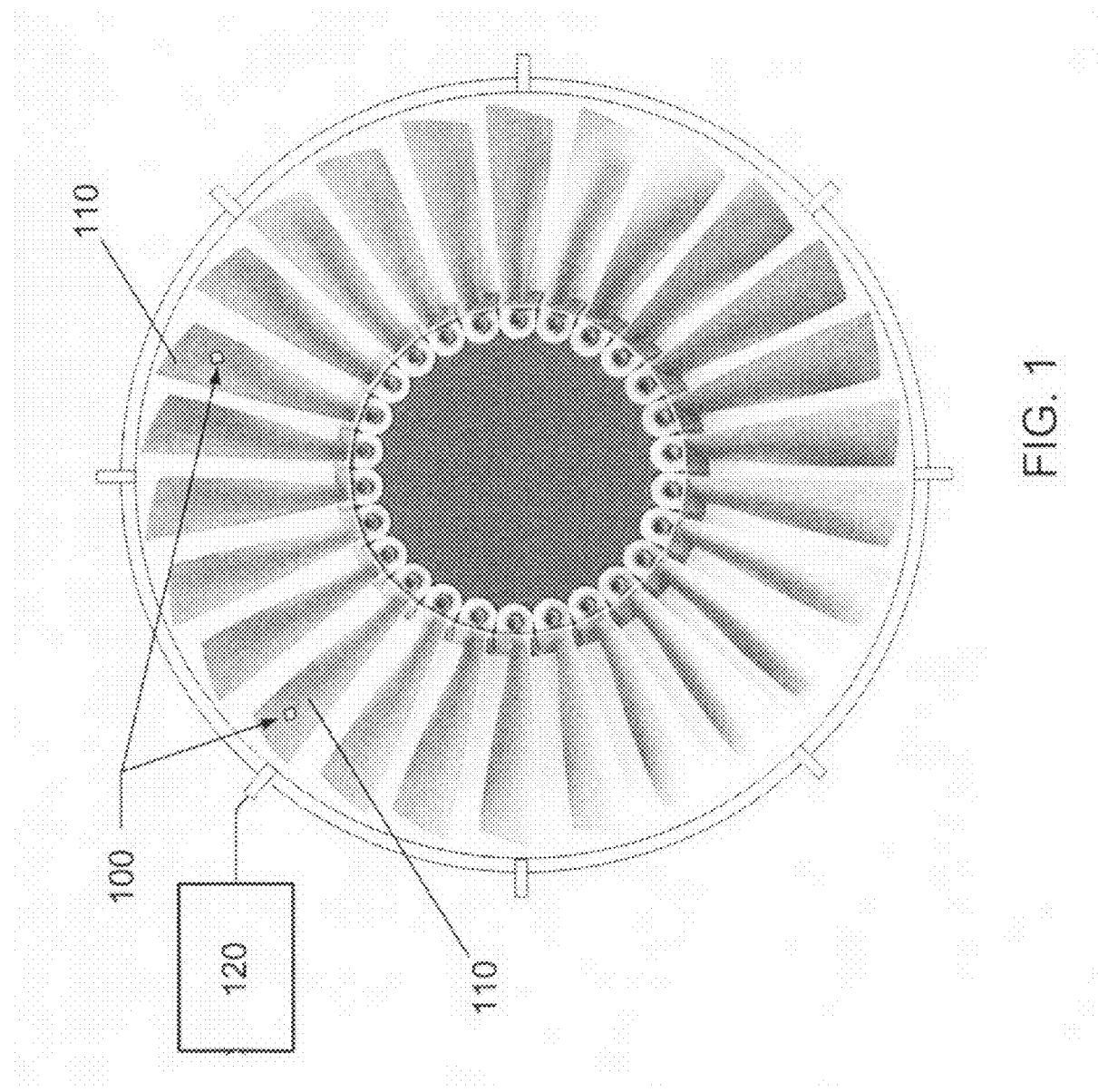
FIG. 1 is a simplified pictorial representation of one embodiment of a strain gauge and transceiver/processor as they would be installed in a turbine engine.

Referring to FIG. 1, one embodiment of a low mass strain gauge 100 is attached to turbine blades 110 to measure strain, and send signals to an outside instrumentation system 120 (made up of a transceiver, signal processing and digital input/output connections to external strain measurement users). The passive wireless strain gauge in its various forms has low mass when fabricated using thin film lithography and associated thin film deposition technology or employing very small diameter wires and attachment techniques using laser welding. The advantage of the thin film version is that it can deposited directly onto the engine blades without affecting the blade's balance or gas flow path through the engine. The downside is that the gauge factors are lower and thus, the signal processing is more difficult.

Figure 2:
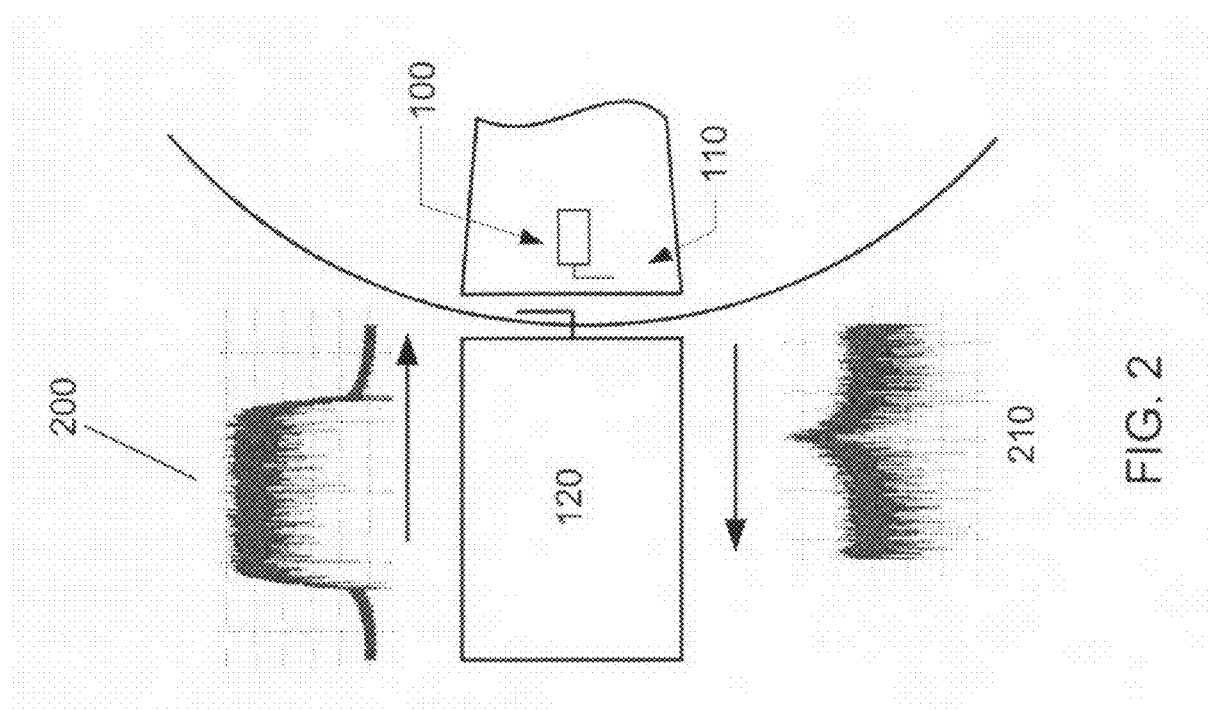
FIG. 2 is a simplified depiction of one embodiment of interrogation and response from a strain gauge

Referring to FIG. 2, a passive wireless transponder 100 responds to RF impulse "pings" 200 from a transmitter/receiver/processor 120. Once the gauge 100 receives the "ping" 200, a return signal is generated that communicates the relative strain on the engine component 210. Thus, the wireless transponder 100 can operate in the environment of a jet engine, requires no power, and the data can be accessed when needed (on demand) and thus can be used for health monitoring (among other things) which is a major step in the direction that the end users want to see in future aircraft.

Figure 3:
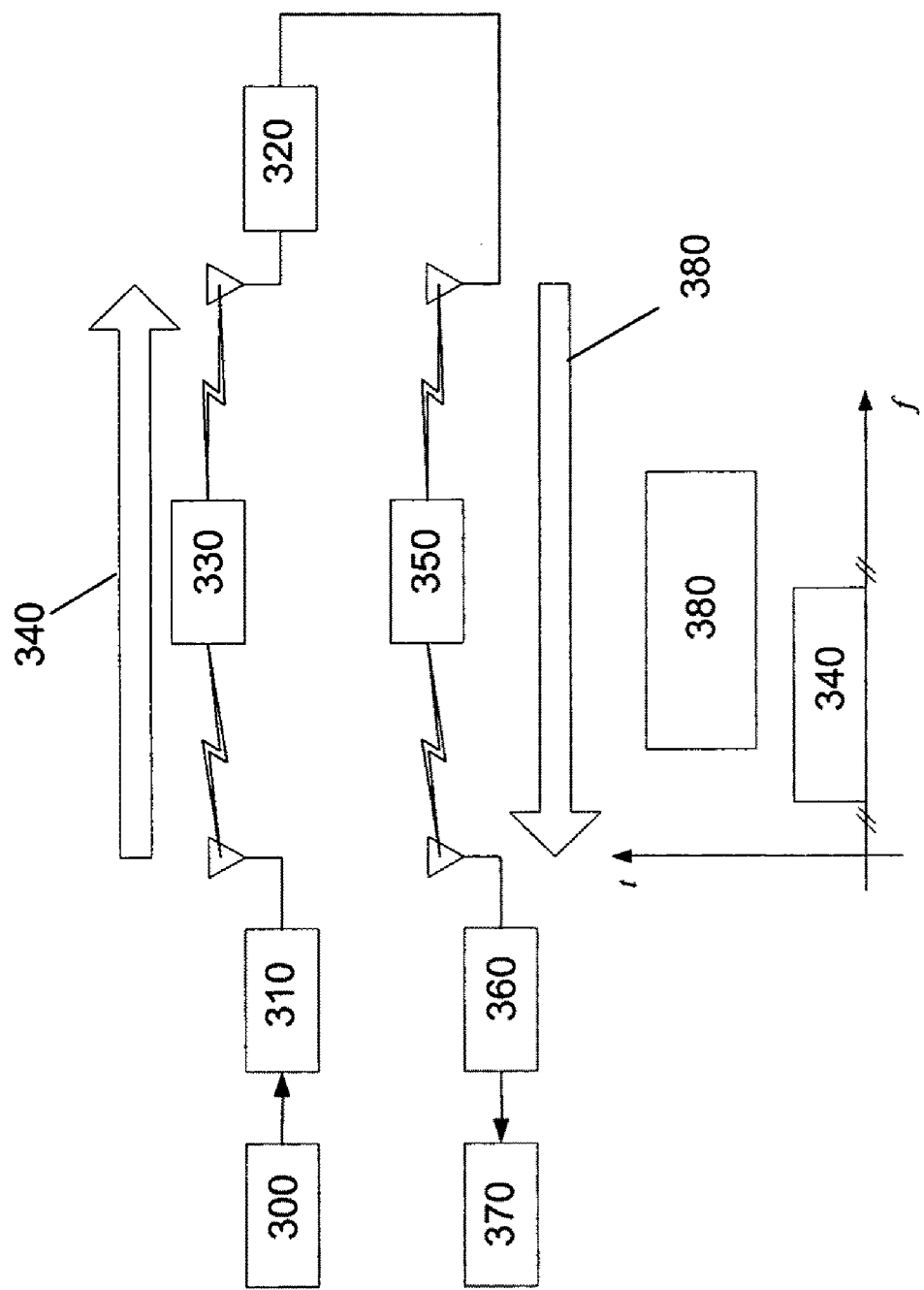
FIG. 3 is a simplified pictorial representation of one embodiment of the generation, transmission and reception of the interrogating and response signals.

A high level functional design for one embodiment of an instrumentation system associated with the passive wireless strain gauge is shown in FIG. 3. An interrogation signal 300 is generated to be transmitted to the gauge. The signal is broadband in frequency so that energy will be received by the gauge at the frequency at which it is currently resonant due to the degree of strain present. The interrogation signal is up-converted 310 to a carrier frequency for efficient transmission to the gauge 320 given (among other things) the physical constraints of the transceiver and gauge antennas and associated circuits, and the time varying channel 330 characteristics. The 2 GHz to 6 GHz RF band works well given these constraints. The RF up-converted interrogator signal 330 is transmitted to the gauge 320 which receives the signal and produces a response which has characteristics that indicate the amount of strain being measured. The response signal 380 is transponded through the time varying response channel 350 and is received via the antenna by the receiver in the instrumentation system. The response signal is down converted 360 and the strain measurement 370 is made by processing this transponded signal to extract features that indicate the strain measured by the gauge.

Figure 4:
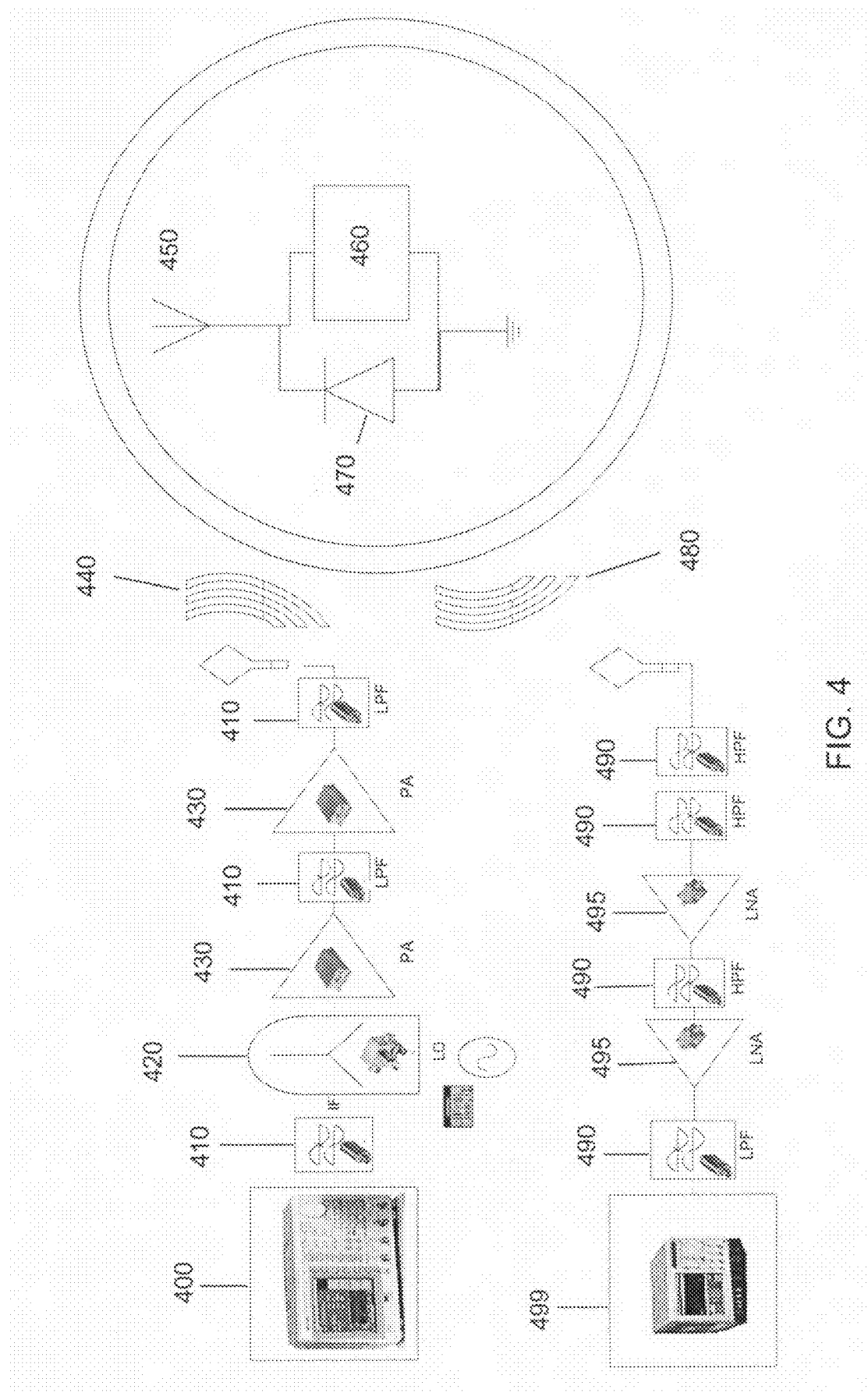
FIG. 4 shows one embodiment of the functional elements in the generation and reception of the interrogation and response signals.

FIG. 4 shows a more detailed version of the process flow. A function generator 400 feeds a series of low pass filters 410 and amplifiers 430 converted to a carrier frequency by a mixer and local oscillator 420 $d$ to produce an interrogation signal 440. The interrogation signal is received by the wireless strain gauge antenna 450. The variable resonator 460 and diode doubler 470 provide a response signal 480. The response signal 480 is received by a series of high pass filters 490 and amplifiers 495 to be processed in the instrumentation system 499.

In addition to measuring strain, the strain gauge device functions to receive the interrogation signal and transoms the interrogation signal in such a way that measured strain can be estimated by the signal processing algorithms in the instrumentation system. These functions are performed by a passive microwave circuit.

Figure 5:
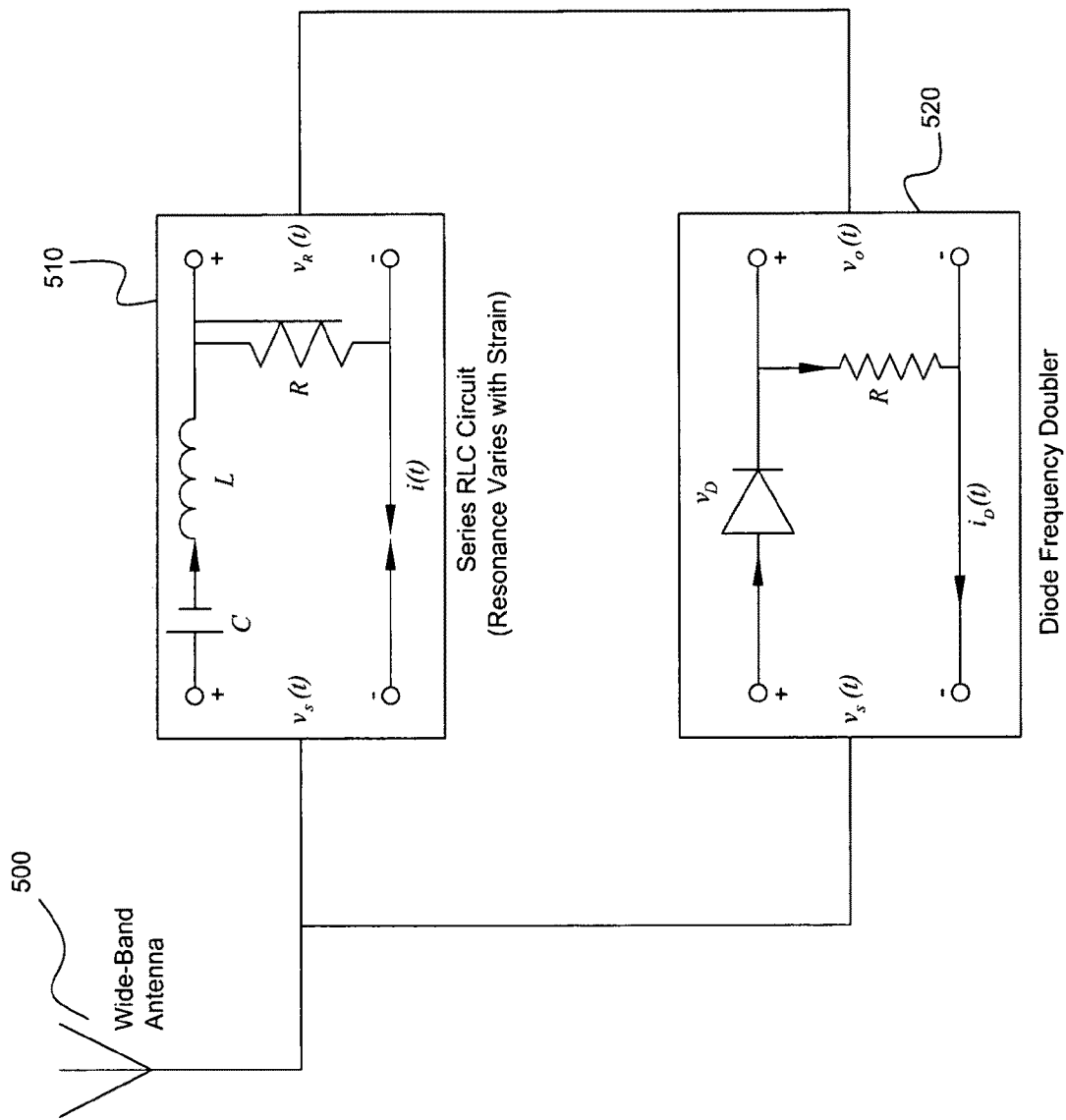
FIG. 5 shows a schematic view of one embodiment of the circuit elements in the microwave circuit that makes up the strain gauge and the transponder.

One embodiment of the passive microwave circuit is shown in FIG. 5. In this embodiment, a common wideband microwave antenna 500 receives the interrogation signal which is then coupled to the RLC resonant circuit 510. The resonant circuits frequency of resonation is determined by the amount of strain present. The circuit will "pass" some portion of the wideband interrogation signal, where the frequency of the passed signal is based on the strain present. Energy associated with the non-resonant frequencies will be blocked. The passed energy is coupled to the diode frequency double circuit 520. This circuit contains a non-linear device (diode) which causes harmonics of the passed frequency to be created. The passed signal along with these harmonics are coupled to the wideband antenna 500 and transmitted back to the interrogation device. The harmonic signal generation is necessary so that the signal processing algorithms can separate the interrogation signal (which is present at a relatively high power) from the return or transponded signal.

Figure 6:
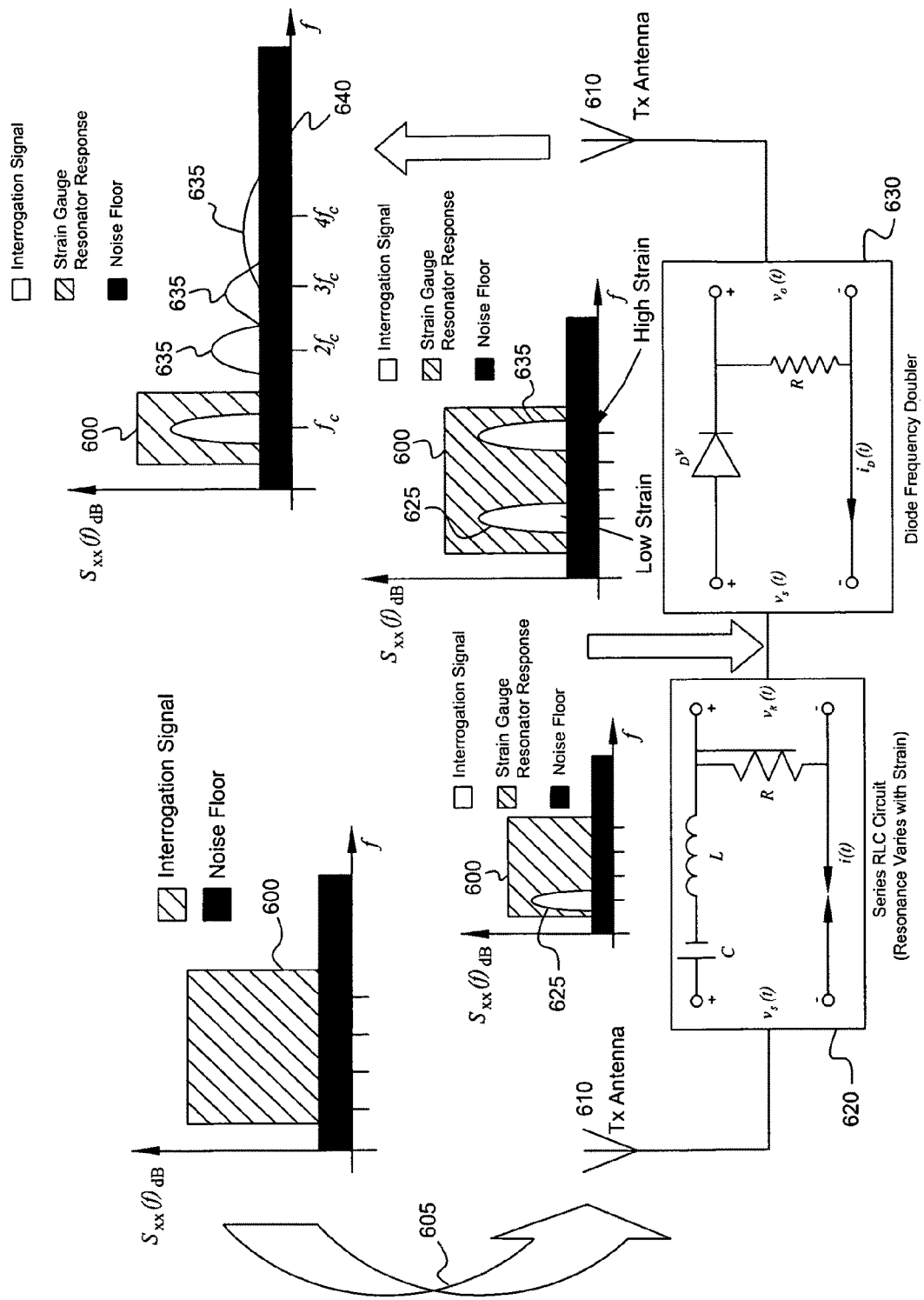
FIG. 6 is a simplified pictorial representation of one embodiment of the interrogation signal, resonant part of the interrogation signal in the RLC circuit, frequency doubled signal generated from the resonant signal, and combined signal received to be signal processed.

FIG. 6 shows a composite view of the signals in the instrumentation system and the gauge. The wideband microwave interrogation signal 600 is generated and transmitted 605 by the instrumentation system transmitter function. The signal is received by the gauge device microwave antenna 610 and coupled to the resonant circuit 620. The resonant circuit 620 passes selected frequencies 625 from the wideband signal 600 which are coupled to the diode frequency doubler 630. The diode doubler 630 creates harmonics (including a second harmonic signal) 635 which are coupled back to the microwave gauge antenna 610 and transmitted back to the receive function in the instrumentation system. The signals present in the receiver of the instrumentation function include noise 640, the transmitted interrogation signal 600, the fundamental resonant circuit passed signal 625 and harmonics 635 of the fundamental created by the diode doubler 630.

Figure 7:
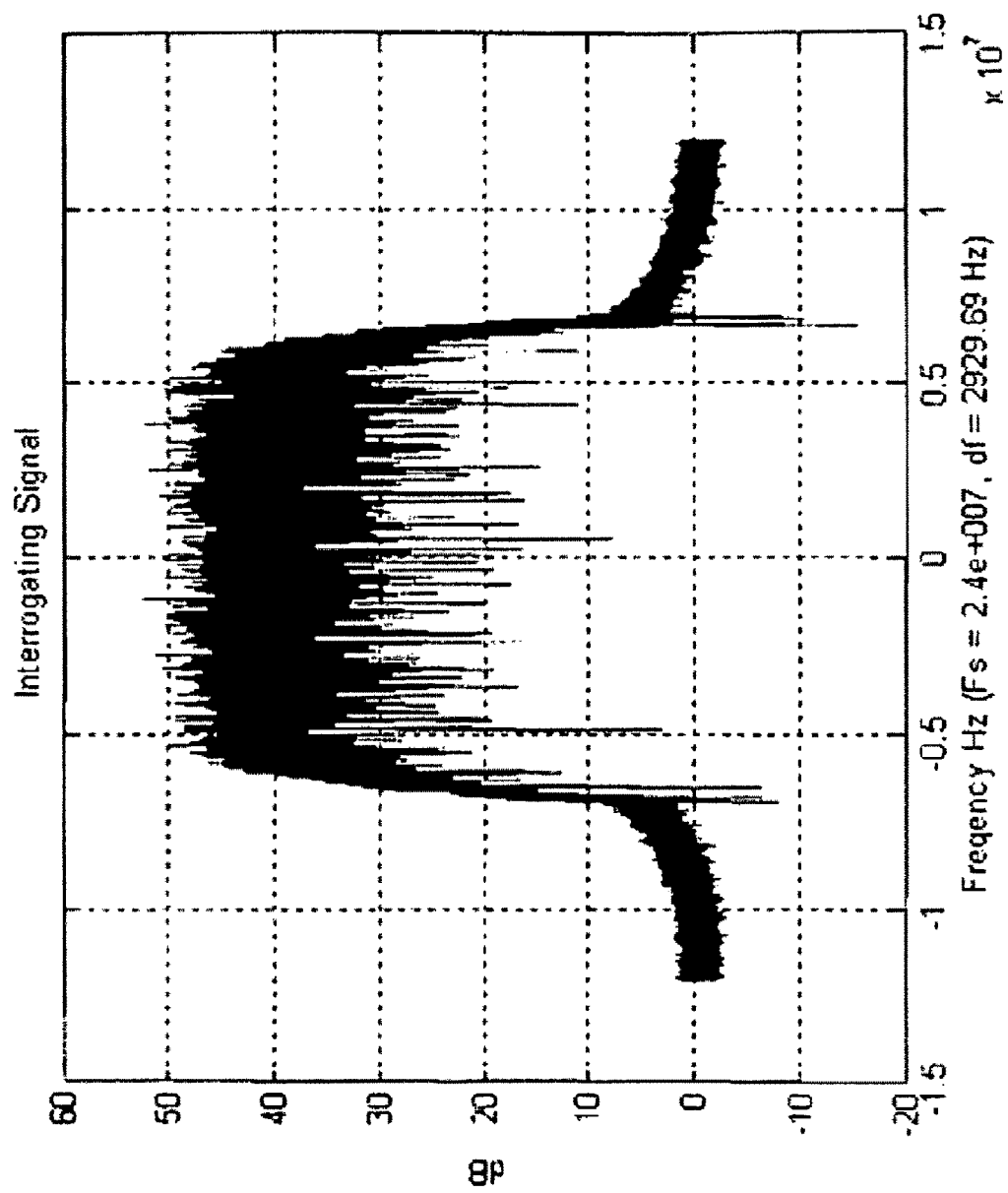
FIG. 7 shows one embodiment of an interrogator signal.
Figure 8:
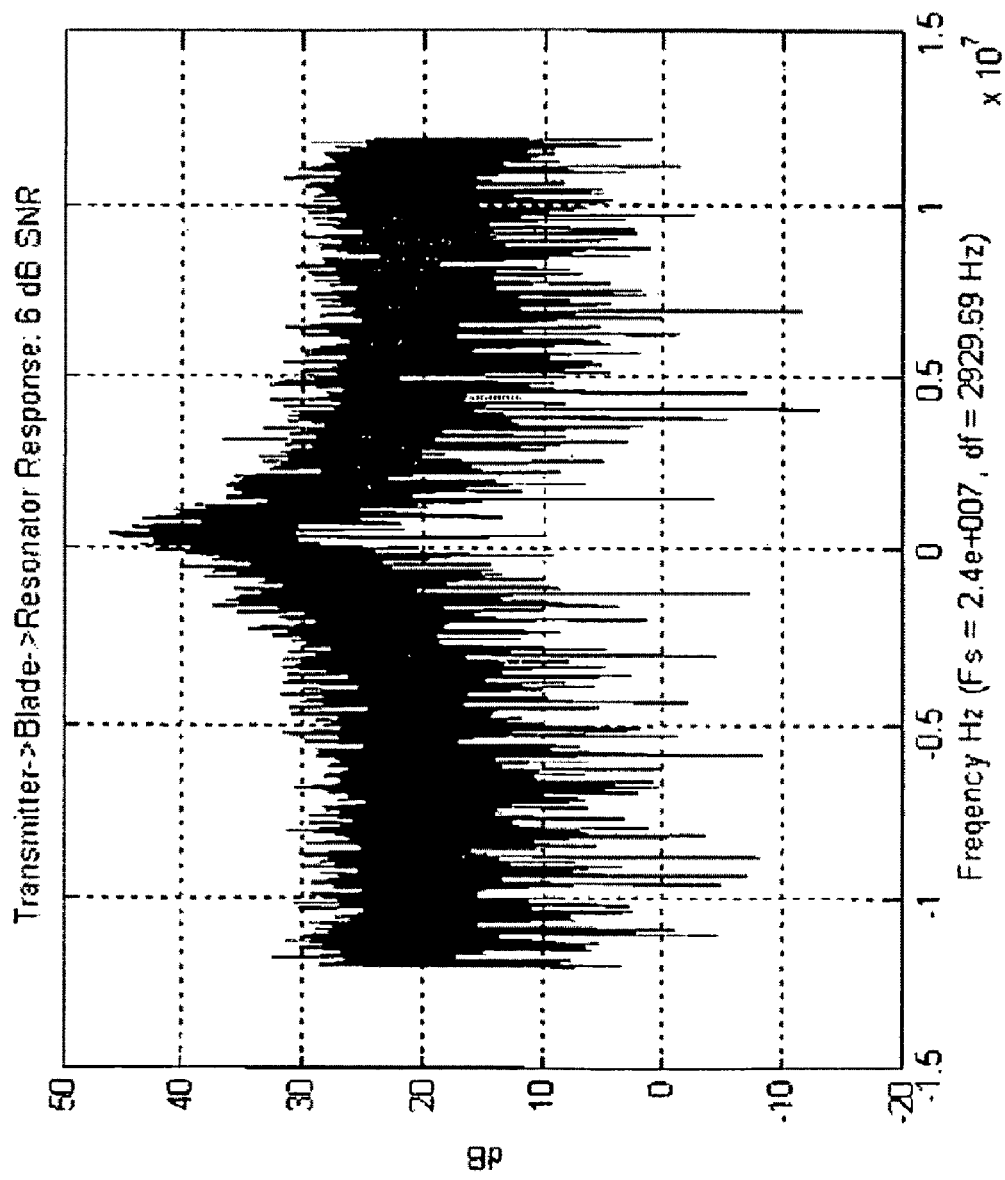
FIG. 8 shows one embodiment of a raw received doubled resonator signal.

The signal processing algorithms in the instrumentation system isolate a harmonic signal (usually the second due to its higher power), and estimate measured strain by measuring the RF frequency of the harmonic. An example of one embodiment of an interrogation signal is shown in FIG. 7. An example of one embodiment of the received (at the instrumentation system receiver) second harmonic generated by diode doubler is shown in FIG. 8.

Figure 9:
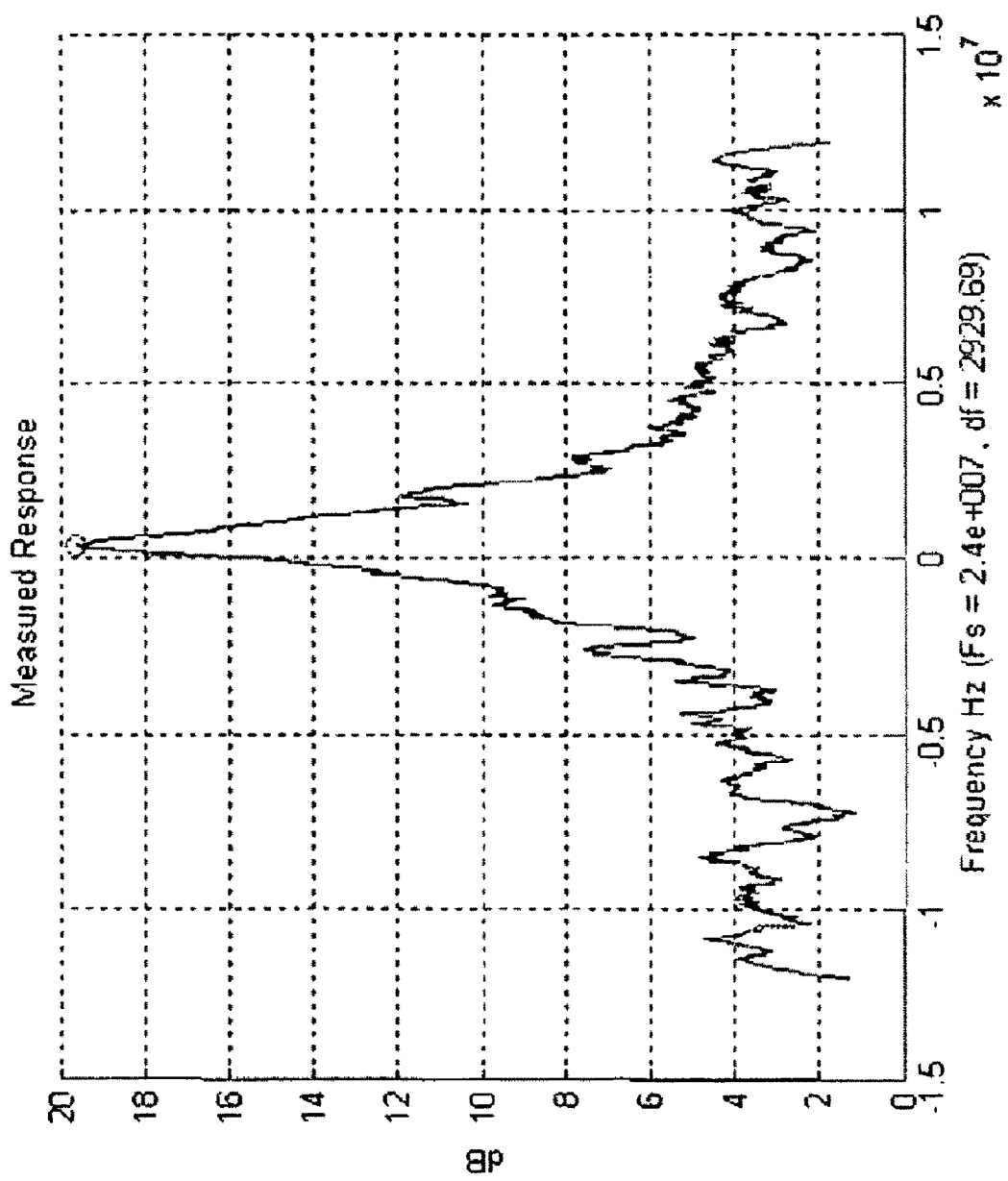
FIG. 9 shows one embodiment of a signal processed version of the raw received signal.

Once the harmonic is isolated in frequency, signal processing algorithms are employed to estimate the peak value of the harmonic. This value can be translated into capacitance shift and then to strain measured by the gauge. The peak estimation step is well known in the prior art in the field of spectral estimation. A number of filtering techniques (including using a Savitzky-Golay filter to reduce noise while preserving other important characteristics) and peak estimation techniques (such as using Yule Walker equations, minimum mean square error method and forward linear prediction method) can be employed. FIG. 9 is an example of the resultant spectrum after the raw harmonic signal shown in FIG. 8 is appropriately filtered.

Figure 13:
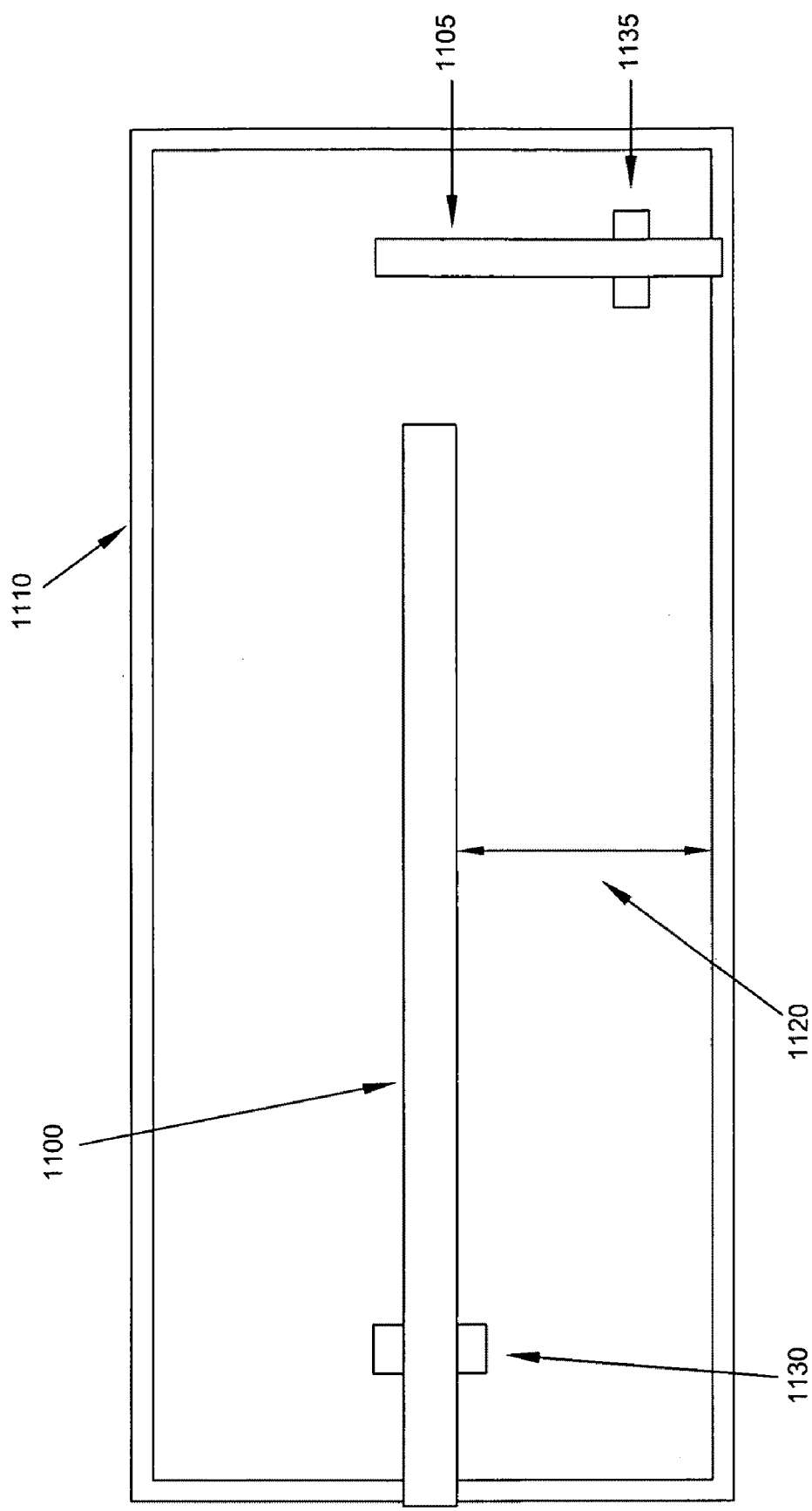
FIG. 13 shows a simplified pictorial representation of one embodiment of temperature compensation for a SVAG variant.

The prior description applies to the processing that would be performed for measuring the strain produced by one strain gauge. It is possible for multiple strain gauges to be placed on different blades (two are shown as an example in FIG. 1), or on different strain axes of the same blade (as shown in FIG. 13). In this case, the instrumentation system would interrogate and receive transponded signals in a time division multiplexed fashion from the strain gauges as the passed in close proximity to the instrumentation system antenna.

A number of different versions of the passive wireless strain gauges are disclosed herein, and can be fabricated on ceramic or titanium constant strain beams and tested. These embodiments include various types of capacitors in an RF circuit along with an antenna and diode as well as electrical connection to a ground plane. Horizontal and vertical interdigitated capacitors in both thick and thin film form as well as buckled beam capacitors in wire form are all candidates in an attempt to achieve the largest gauge factor possible. Following are descriptions of various passive wireless strain gauge designs and their attributes. The Strain Variable Air Gap (SVAG) version will be discussed first and used to illustrate many of the unique and beneficial features of the passive wireless strain gauge designs.

Figure 10:
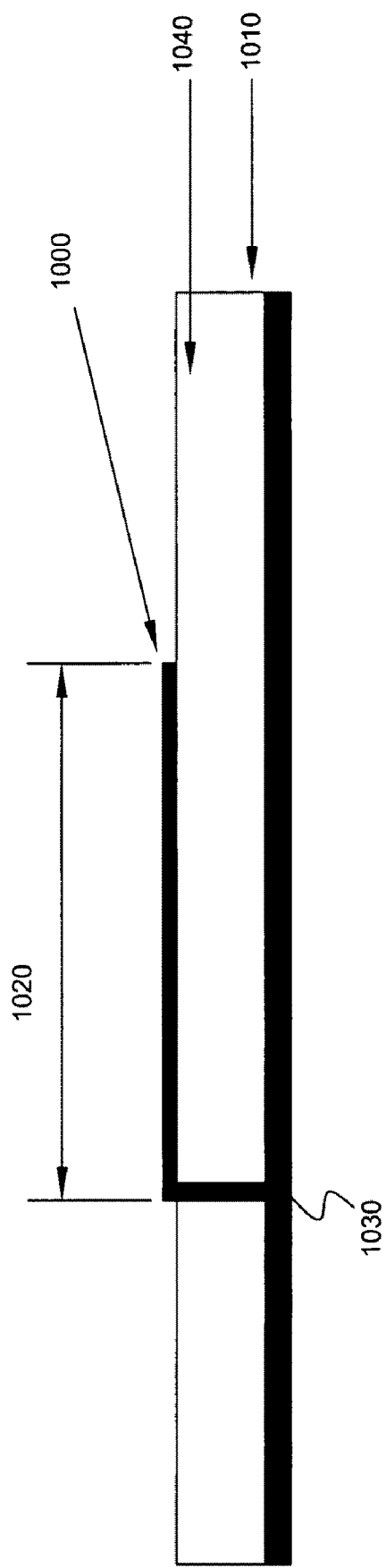
FIG. 10 shows a simplified pictorial representation of one embodiment of a strain gauge microwave antenna.

With reference to FIG. 10, an embodiment of a passive wireless strain gauge with the largest gauge factor is the Strain Variable Air Gap (SVAG), where the antenna 1000 itself is the active strain element and the distance from the tip of the antenna to the ground plane 1010 dictates the change in frequency which is proportional to the strain. The SVAG antennas, regardless of type, have enhanced reflectivity or Radar Cross Section (RCS) at their frequency of resonance. The resonant antenna interacts strongly with the incoming electromagnetic energy and increases the RCS of a structure by several orders of magnitude, depending on the antenna configuration and orientation. A change in the mechanical strain of an object is translated into a change in the resonant frequency of an antenna, then the strain is measurable remotely and without any physical connection to the object under investigation. With the appropriate calibration, the change in the RCS signature of the antenna with respect to frequency is a direct measurement of the strain. Therefore, for SVAG the antenna design is a critical part of the device, especially considering operation on a turbine engine blade. Key design issues include relatively small size (<10 mm long), resonant frequency tunable in a straightforward manner, high efficiency, and good performance on or very near a conductive ground plane.

Transmission Line antennas are a class of antennas that can address all of the critical design issues and are basis for the SVAG antenna. Typically, a Transmission Line antenna is a conductive wire or narrow conductive strip about ¼ wavelengths long 1020 and placed parallel to and very close to (<0.01 wavelengths) a much larger ground plane surface. One end of the ¼ wave conductor is connected to the ground plane 1030 and the other end is not connected. Close to the grounded end of the conductor, the impedance of the strip is close to 50 ohms and purely resistive.

Figure 11:
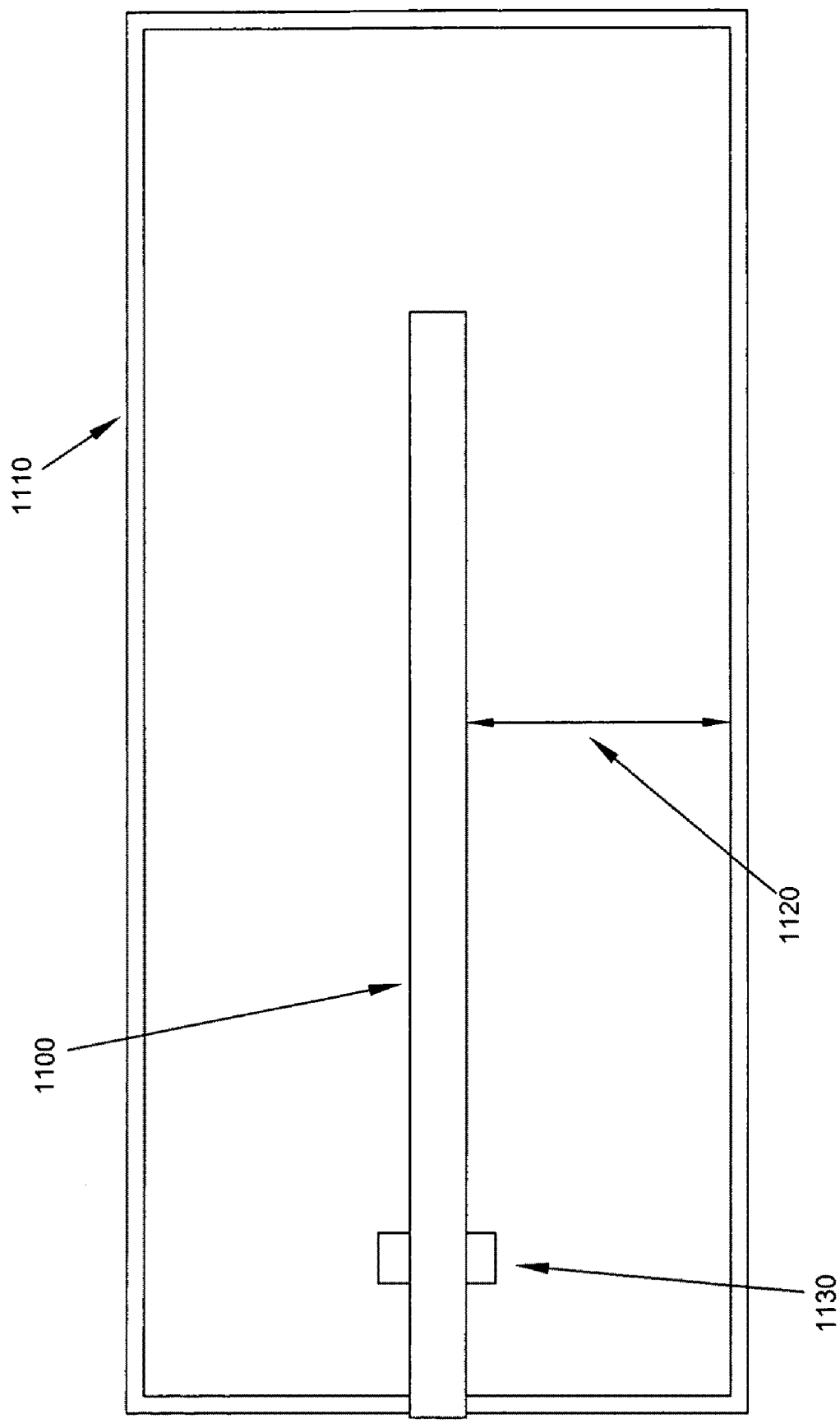
FIG. 11 shows a simplified pictorial representation of one embodiment of a SVAG variant.

The antenna shown in FIG. 11 will be an efficient antenna provided the substrate material 1040 is low-loss. The resonant frequency of the antenna pictured is linearly proportional to the length of the radiating strip (on the top surface of the structure shown). The change in resonant frequency due to a change in the strip length will be quite small with respect to the amount of strain to be measured on the turbine blade. If the length of the radiating strip is shortened to 0.01 to 0.1 wavelengths (from the original 0.25 wavelength) and a shunt capacitance is connected between the ground plane and the open end of the antenna, the original resonant frequency of the antenna can be maintained (based on prior art transmission line theory). This new antenna structure will have a higher Q and will have a resonant frequency that is highly sensitive to the capacitive loading.

An important consideration in the design is the amount of tuning possible with capacitive loading. For the turbine blade application, the 2 to 3 GHz frequency band was chosen as a good compromise between antenna size and antenna efficiency. At lower frequencies, the antenna element becomes too large to measure strain in a small area while at higher frequencies the substrate material can introduce large losses. The RCS of the antenna is dependent on the antenna efficiency, so a large RCS will be obtained with an efficient antenna.

Figure 12:
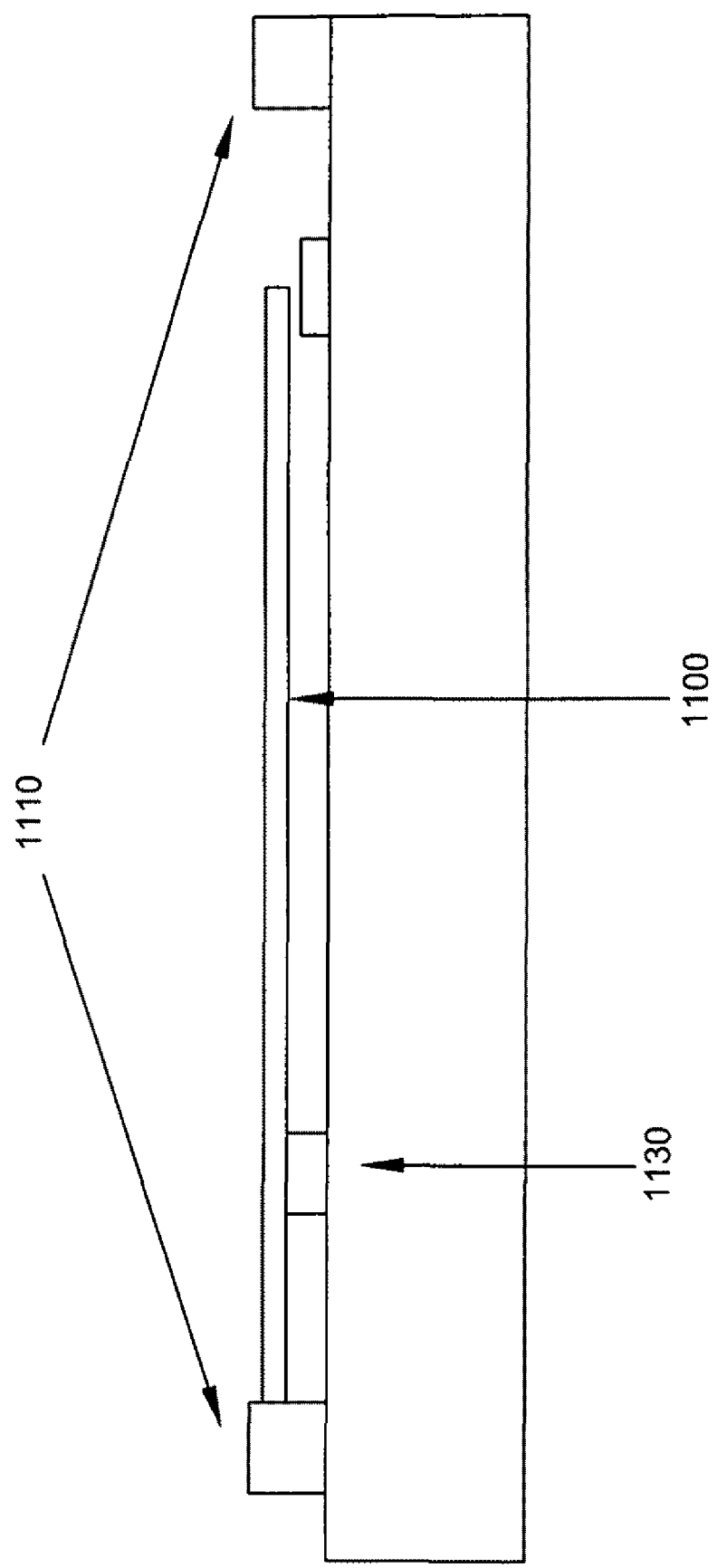
FIG. 12 shows a simplified pictorial representation of one embodiment of an SVAG variant.

With reference to FIGS. 11 and 12, an embodiment of an antenna that meets the requirements is 16 mm long×1 mm wide antenna element 1100 fabricated on a 0.25 mm thick PCB Rogers 4003 substrate. The distance from the frame 1110 to the antenna 1100 should be about at least five wire diameters 1120. The diode 1130 should be about 1.5-3 mm from the end of the antenna 1100 connected to the frame 1110. An antenna of this type can be expected to have a shift in resonant frequency due to the capacitance change of on the order of 475 MHz/pF—a very large change relative to achievable capacitor values. Other designs are useful including modifications where the capacitor is formed from inter-digitated conductive "fingers" and the antenna element is placed on a ground plane formed into a constant strain beam shape. The inter-digitated capacitor can be designed so that when the constant strain beam is put under strain, the capacitance is reduced. Antenna designs of this type can be expected to have 70 MHz of resonant frequency shift with 2 cm of deflection resulting in a gauge factor of approximately 30.

FIG. 13 illustrates an approach to isolating resonance changes due to strain changes from those due to temperature changes. Two SVAG gauges are placed on the blade in an orthogonal configuration. A second antenna 1005 and diode 1135 is positioned orthogonal to the first antenna 1100 and diode 1130. Both gauges should experience similar temperature changes, while only the gauge oriented to experience blade strain will experience strain-based resonance changes. With this configuration, the temperature related resonance changes can be measured and used to isolate the strain related resonance changes.

Figure 14:
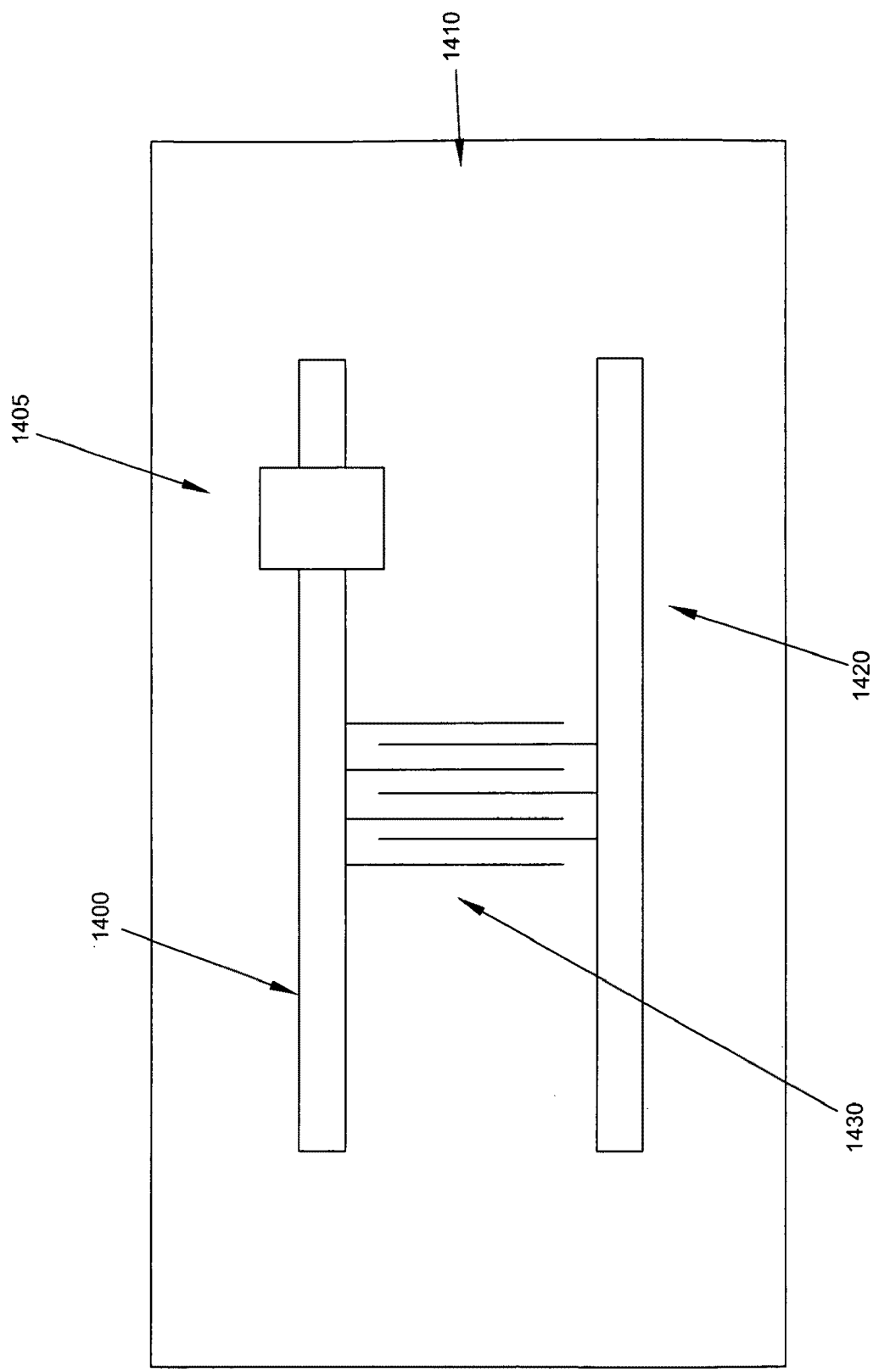
FIG. 14 shows a simplified pictorial representation of one embodiment of a Buckled Beam variant.

With reference to FIG. 14, in another embodiment a passive wireless strain gauge design uses a "buckled beam" approach. The top rail 1400 is not connected to the titanium beam ground plane 1410 but is connected to the antenna 1405. The ground rail 1420 is connected to the ground plane 1410 at each end using silver epoxy or laser welding or the like. In this design, strain is measured by capacitive changes induced through movement of inter-digitated conductive "fingers 1430.

Figure 15:
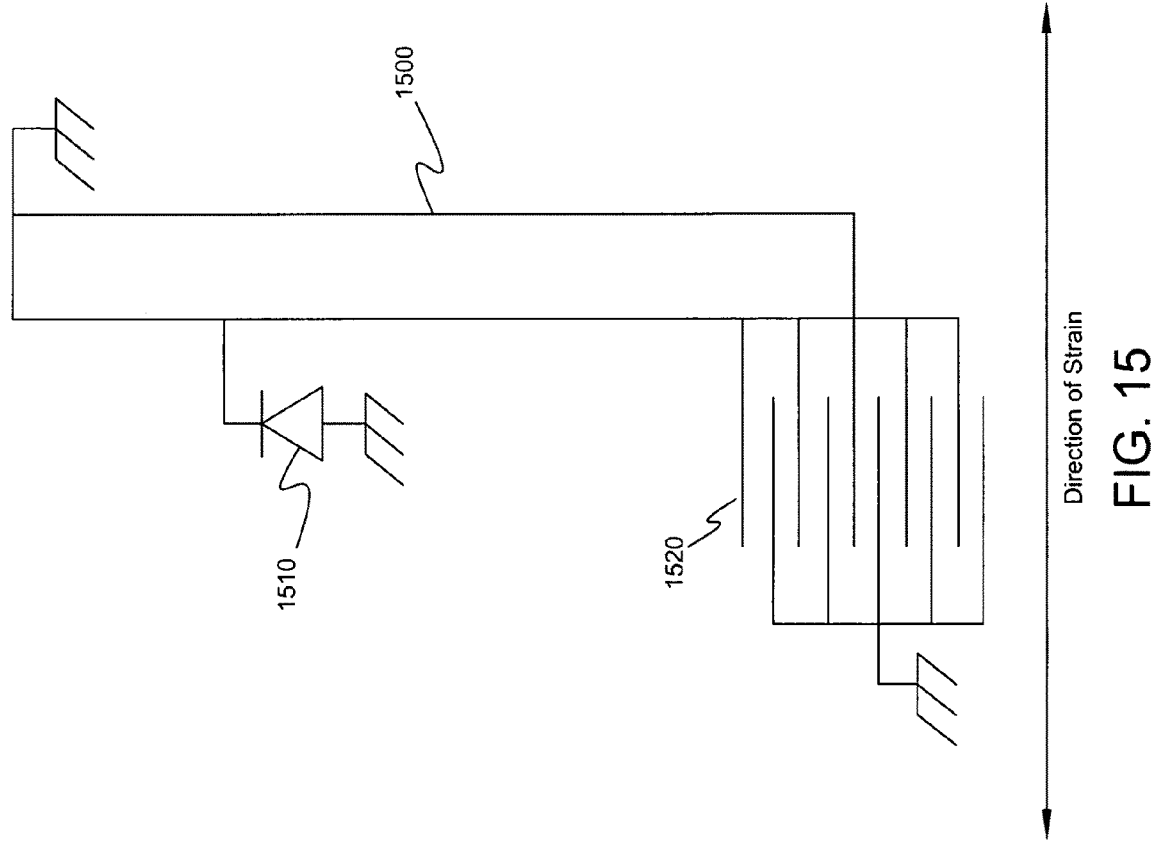
FIG. 15 shows a simplified pictorial representation of one embodiment of a microwave antenna and other selected circuit components oriented on a blade with respect to the direction of strain

FIG. 15 shows how an example of how a buckled beam capacitor and associated circuitry including an inverted "F" antenna 1500, a diode doubler 1510 and inter-digitated conductive "fingers" 1520 would be oriented with respect to the direction of strain.

Figure 16:
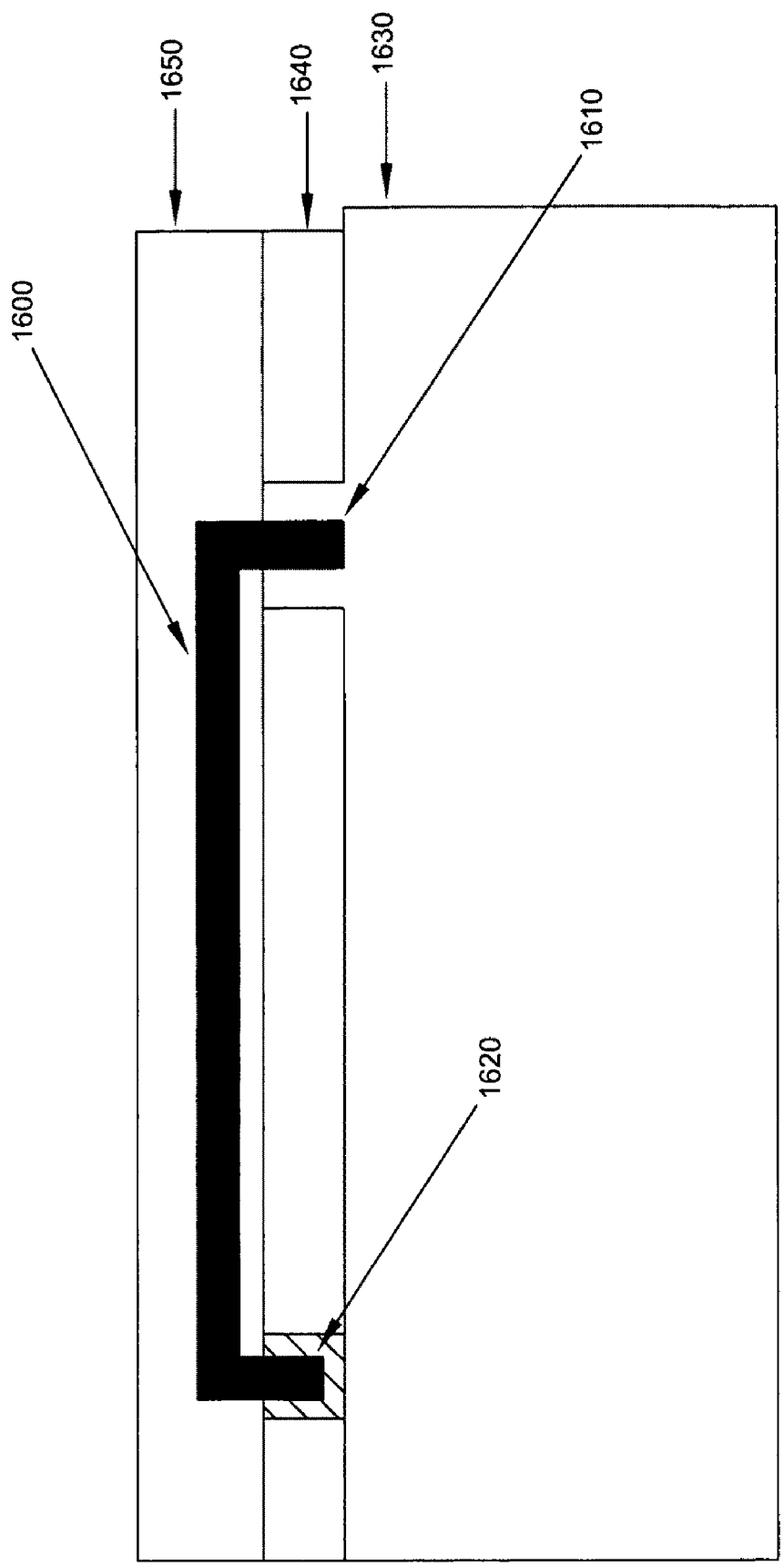
FIG. 16 shows a simplified pictorial representation of one embodiment of a Buckled Beam variant in cross-sectional view.

FIG. 16 shows a side view of a buckled beam design. Antenna 1600 is grounded 1610 at one end and is floating at the other end 1620. The substrate can be made of titanium 1630 with a dielectric layer 1640 and a PDMS cover 1650.

Figure 17:
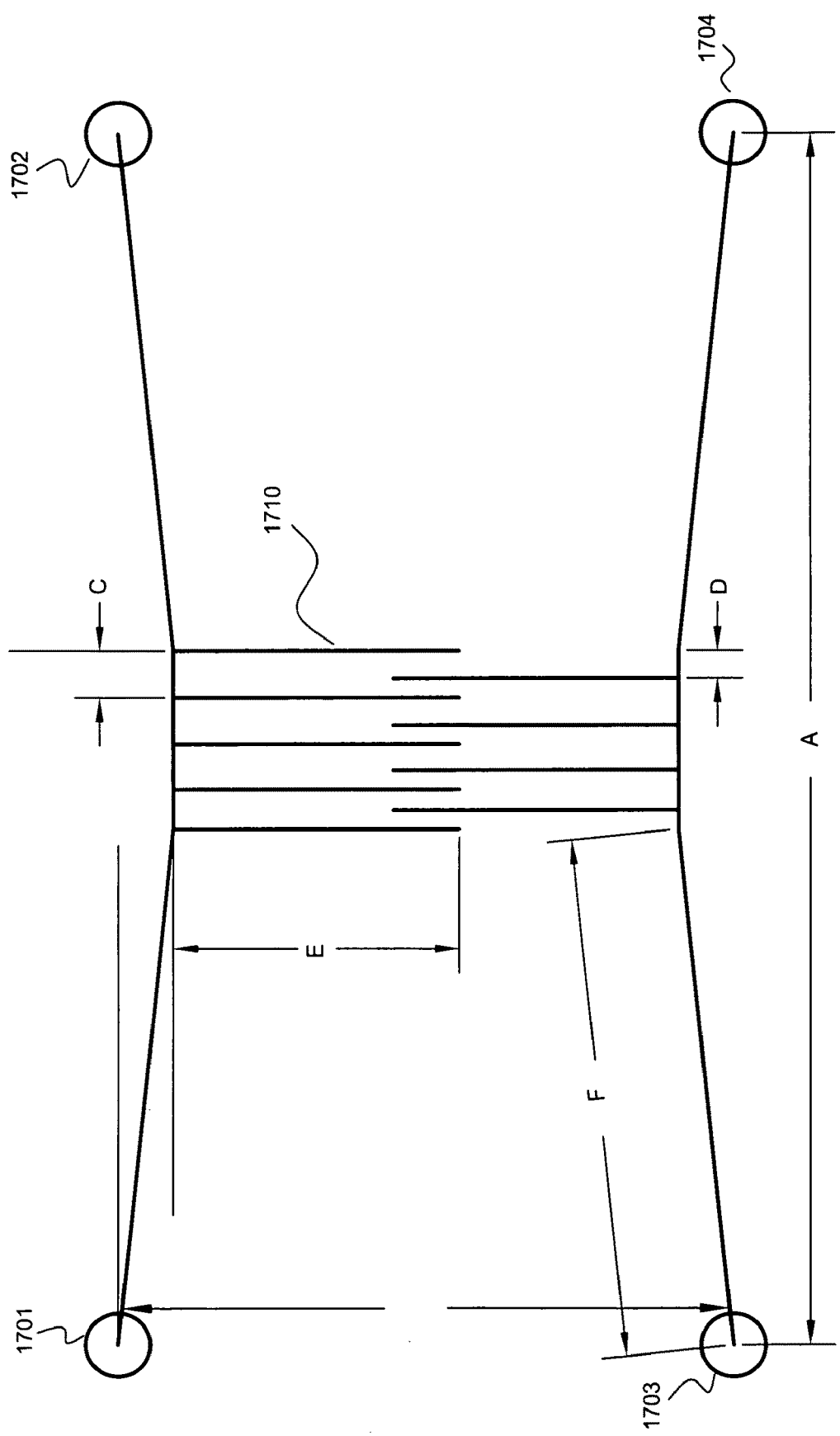
FIG. 17 shows a simplified pictorial representation of one embodiment of a Buckled Beam transponder variant.
Figure 18:
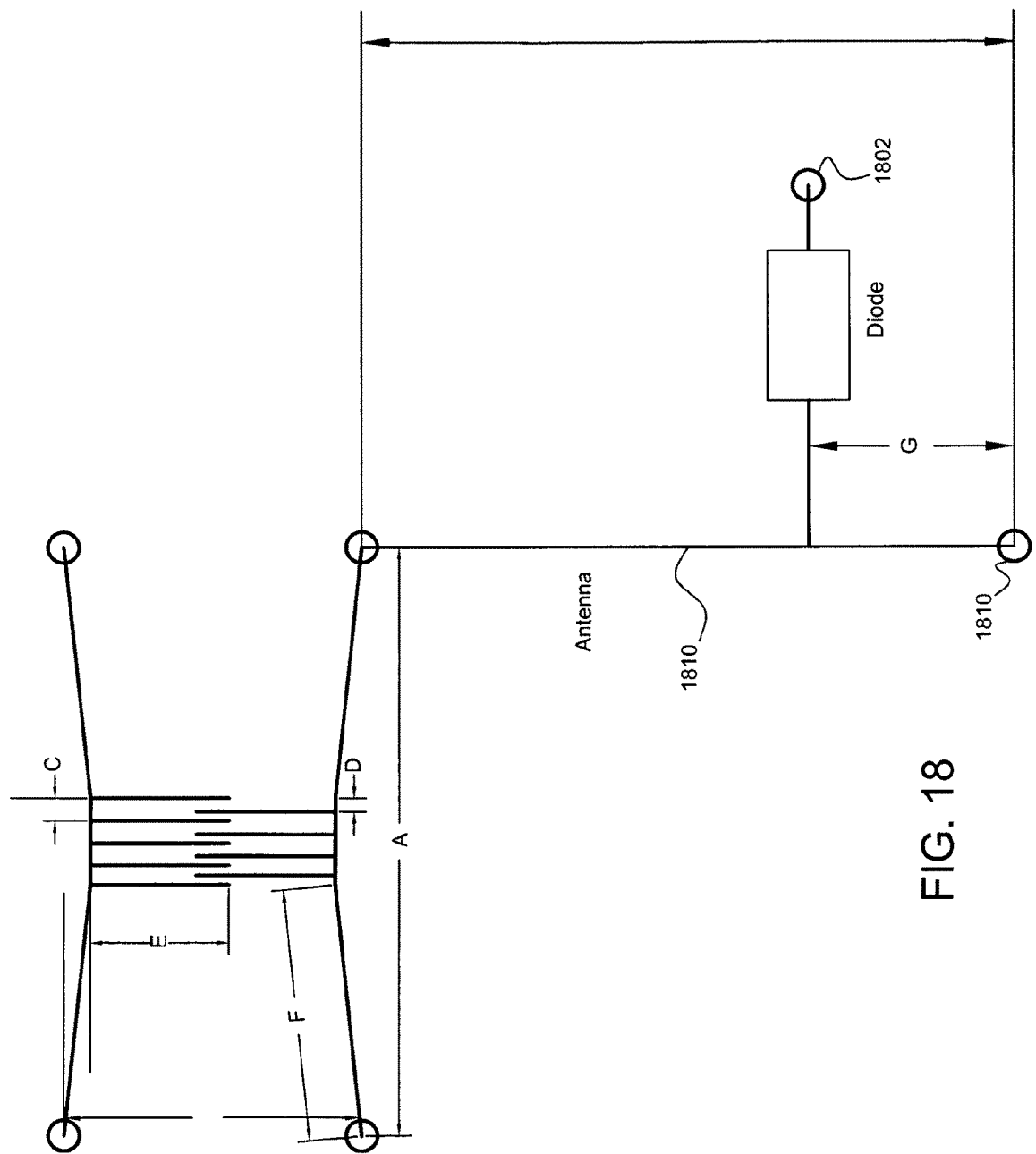
FIG. 18 shows a simplified pictorial representation of one embodiment of a Buckled Beam including antenna and diode.

Buckled beam gauges can be fabricated using wire-based techniques. An embodiment of such a device is shown in FIGS. 17 and 18 with the following characteristics: The structure is 4 mm long A×2 mm wide B. The diameter of the all of the wires (except the posts) is 50 um. The four posts 1701-1704 hold the transponder on the substrate of the strain beam. Posts 1701 and 1702 have length of 0.5 mm and the wires that make these posts have a diameter of 100 um. Posts 1703 and 1704 have a length of 0.5 mm and the wires that make these posts have a diameter of 50 um as in the rest of the structure. The total number of fingers is nine with five fingers on the top electrode and four fingers in the bottom electrode 1710. The spacing between fingers of one electrode is 150 um from the center of the finger to the center of the other finger C. When the two electrodes are brought together, the inter-digitated capacitor is formed yielding spacing between fingers of 75 um D. Thus, if the fingers (wires) have a diameter of 50 um the net spacing from the edge of a finger to the edge of the other finger is 25 um. The length of the fingers is 0.9212 mm E. The length of the "buckled beams" is 1.7108 mm F. The angle that the "buckled beam" forms with respect to the horizontal is approximately 6°.

With respect to FIG. 18, the diode is at 1.2 mm from the end of the antenna G. The antenna 1810 has an approximate length of 6 mm. Posts 1801 and 1802 at the end of the antenna and at the end of the diode respectively have a length of 0.5 mm and the wires that make these posts have a diameter of 100 um. All welds may be made using a laser welding technique.

When the embodiment of FIGS. 17 and 18 described above is fabricated and appropriately connected for testing, it will perform as follows:

1. Resonance at 1.503 GHz and a shift in the resonance to 1.565 MHz will occur with about 2 cm of deflection (800 ustrains).
2. The shift will be about 4.1% and will be repeatable and stable, yielding a gauge factor G=51.

Figure 19:
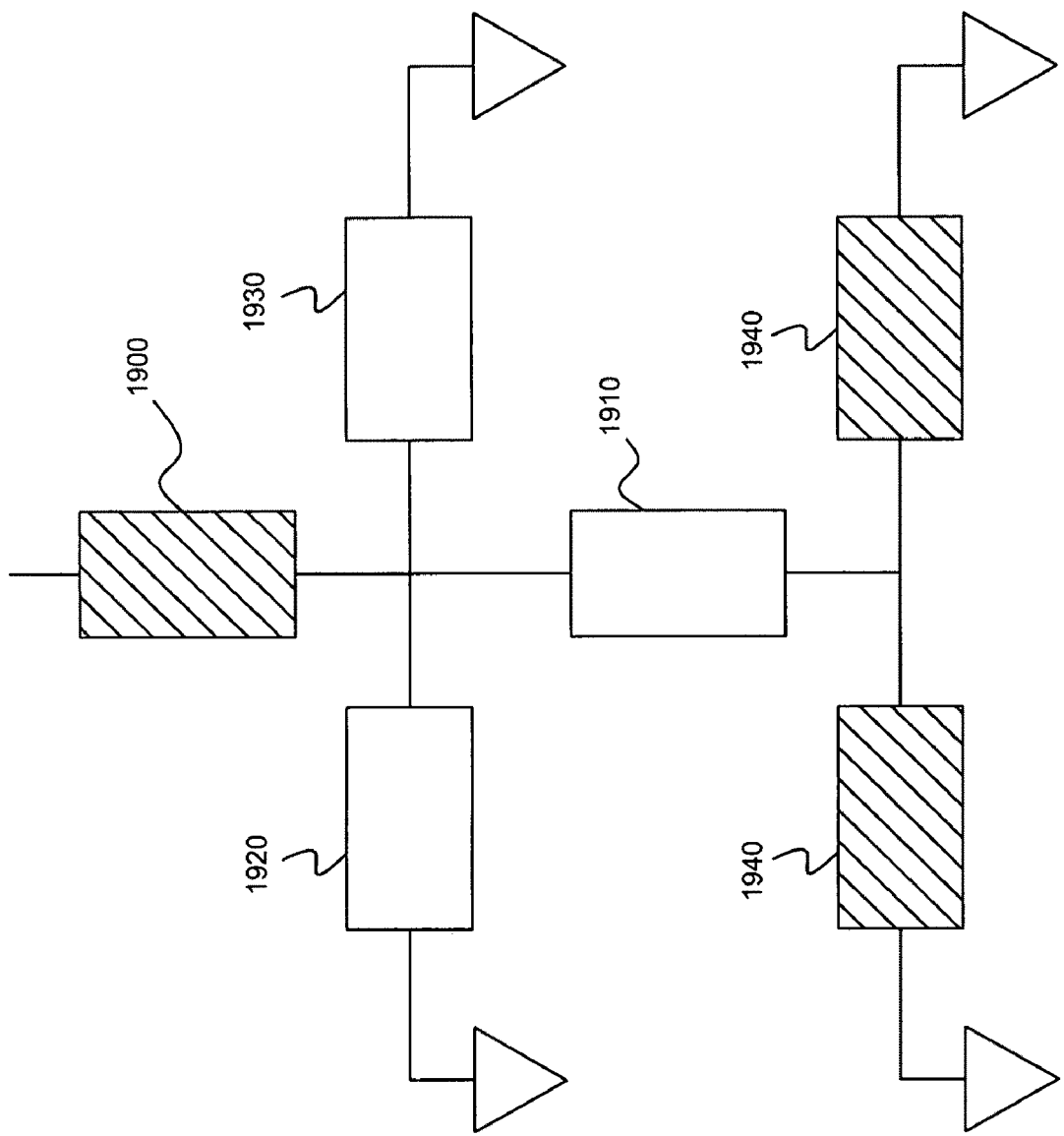
FIG. 19 shows a simplified circuit diagram for a Buckled Beam variant.

A schematic diagram of the circuit formed with a buckled beam design is shown in FIG. 19. A fixed inductor 1900 is shown in place of the antenna. Ideally the inductor 1900 will form a series resonant circuit with the variable capacitor 1910 which has a value of about 0.5 pF. Capacitor 1920 has an approximate value of 0.75 pF and the top rail 1930 has an approximate value in the range of 1.5-2.0 pF. Inductors 1940 have an approximate value of 1 nH.

Figure 20:
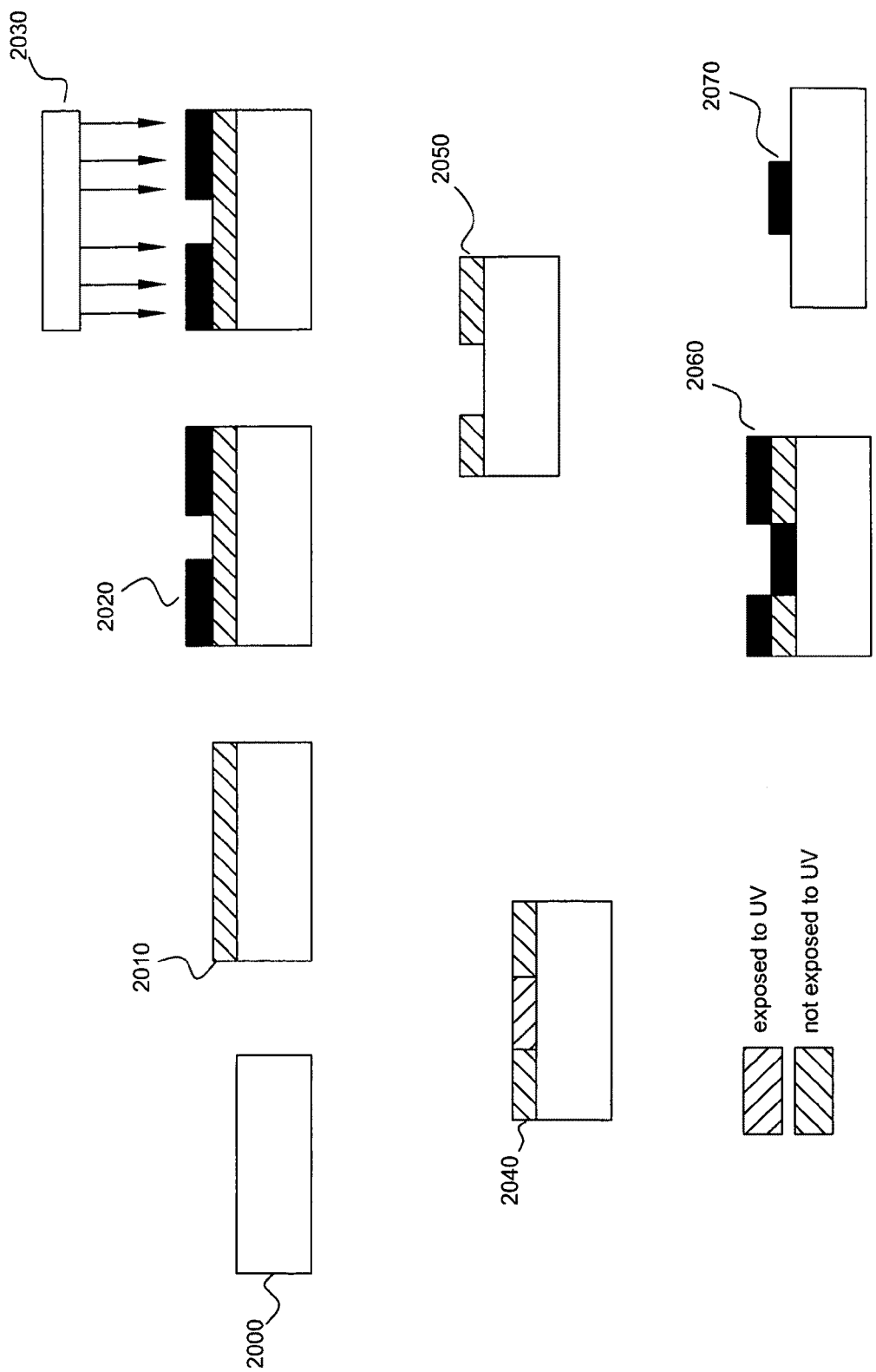
FIG. 20 shows one embodiment of thin film fabrication for the microwave circuits in a strain gauge.

In addition to the novel electrical and mechanical designs described in this disclosure for passive wireless strain gauges, original fabrication techniques have been created to construct devices to provide the required electrical and mechanical properties, and also operate in the harsh turbine engine environment. The fabrication sequence illustrated in FIG. 20 is applicable to thin film vertical capacitors found in some of the gauge designs Clean substrate by rinsing in DI water, acetone and methanol 2000. Spin-cast LOR 10B and bake sample. Spin-cast SC1827 photo-resist 2010 and post-bake sample. Place photomask with sensor pattern over photo-resist 2020 and expose to UV light 2030. Removal photomask 2040 and apply AZ developer to exposed resist layer and hard bake sample 2050. Thin-film deposition through windows created in photoresist (Copper sputtering) 2060. Lift-off process 2070 and spin-cast LOR 50B and bake sample above 250° C. Repeat 2010-2060 for second layer of capacitor. Sputter copper on the back of beam for ground plane. Electroplating copper.

Figure 21:
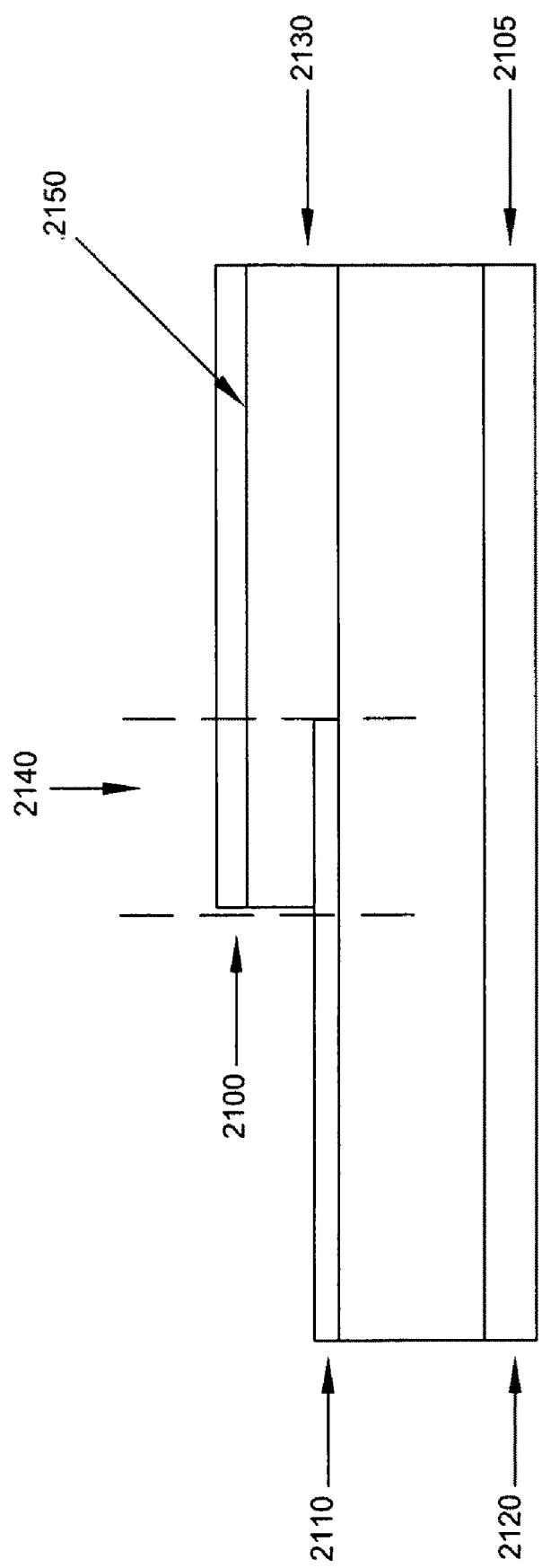
FIG. 21 shows a simplified pictorial representation of the materials to construct the capacitor in one embodiment of a strain gauge.

With reference to FIG. 21, this fabrication sequence of a ceramic beam 2105 can be modified/improved by increasing the plating thickness from 1 um to ~10 um by electroplating both top 2100 and bottom 2110 sputtered copper layers as well as ground plane 2120 to reduce skin effect. Thicker plating makes the deposition of dielectric harder since copper layers are now 10 um. Originally, with thin-film copper layers, dielectric thickness was 8 um. Therefore, kapton tape (60 um thick) 2130 is used as dielectric between plates to ease fabrication. A thicker dielectric decreases the total capacitance (the area 2140 where the top copper layer 2100 and the antenna 2150 overlap), therefore the AC is decreased, making the frequency shift also smaller although the Gauge Factor is maintained.

A novel fabrication approach using thick film technology was also conceived as follows:

1. Clean PCB substrate by rinsing in DI water, acetone and methanol.

2. Spin-cast SC1827 photo-resist and post-bake sample.

3. Place photomask with sensor pattern over photo-resist and expose to UV light.

4. Apply AZ developer to exposed resist layer and hard bake sample.

5. Steps 2-4 should be performed in both sides of the beam using specific photomasks for top and bottom sensor patterns.

6. Etch copper using Ferric Chloride.

7. Remove remaining photo-resist on substrate by rinsing in acetone.

While the foregoing has described what are considered to be preferred embodiments, it is understood that various modifications may be made therein and that the disclosure may be implemented in various forms and embodiments, and that it may be applied in numerous applications, only some of which have been described herein. It is intended by the following claims to claim all such modifications and variations which fall within the true scope of the disclosure.

What is claimed:

1. A method of detecting the amount of deformation of an object using a strain gauge affixed to the object comprising the steps of:
   (a) transmitting a wireless RF signal to the gauge;
   (b) receiving the RF signal at the gauge;
   (c) shifting the RF frequency as a function of the deformation of the object, comprising;
      (i) passing selected frequencies from the wideband signal; and
      (ii) creating at least one harmonic of the selected frequencies;
   (d) transponding the shifted RF frequency signal to an analyzer; and
   (e) in the analyzer, determining a strain in the object as a function of the shift in RF frequency;
   wherein the steps are performed without providing power to the gauge; and
   wherein the step of transmitting the shifted RF frequency includes transponding the selected frequencies and at least one harmonic as a wireless signal to an analyzer wherein the step of determining a strain comprises the steps of
   (i) isolating the at least one harmonic from the transponded signal; and
   (ii) estimating the amount of strain as a function of isolated harmonic.

2. The method of claim 1 wherein the object is a rotating turbine blade.

3. The method of claim 1 wherein the step of shifting the RF frequency uses a series RLC circuit and a diode frequency doubler.

4. The method of claim 1 wherein the step of estimating comprises:
   (a) estimating the peak value of the harmonic;
   (b) determining a shift in capacitance as a function of the estimated peak; and
   (c) measuring the strain as a function in the shift in capacitance.

5. A system for determining the strain in a rotating object comprising:
   a transceiver for transmitting and receiving a wireless wideband signal;
   a signal processor that provides an estimate of strain as a function of a received wireless wideband signal;
   a passive strain gauge affixed to a rotating object comprising:
      a wideband antenna;
      a series RLC circuit;
      a diode frequency doubler.

6. The system of claim 5 wherein the passive strain gauge is a thin film construction type gauge.

7. The system of claim 5 wherein the passive strain gauge is approximately massless with respect to the mass of the rotating object to which it is affixed.

8. The system of claim 5 wherein the passive strain gauge changes resonant frequency proportional to the deformity of the rotating object to which it is affixed.

9. A method of detecting the amount of strain in a rotating object where a strain gauge has been affixed to the object comprising the steps of:
   (a) transmitting a wireless wideband signal to the gauge;
   (b) receiving the broadband signal at the gauge and performing the following steps:
      (i) passing selected frequencies from the wideband signal;
      (ii) creating at least one harmonic of the selected frequencies;
      (iii) transponding the selected frequencies and at least one harmonic as a wireless signal to an analyzer;
   (c) receiving the wireless transponded signals at the analyzer and performing the following steps:
      (i) isolating the at least one harmonic from the transponded signal; and
      (ii) estimating the amount of strain as a function of the isolated harmonic.

10. The method of claim 9 wherein the step of estimating comprises:
    (a) estimating the peak value of the harmonic;
    (b) determining a shift in capacitance as a function of the estimated peak; and
    (c) measuring the strain as a function in the shift in capacitance.

11. The method of claim 9 wherein the transmitted wireless wideband signal is in the range of about 2 GHz to about 6 GHz.

12. The method of claim 9 wherein the step of passing selected frequencies uses an RLC circuit.

13. The method of claim 9 wherein the step of creating at least one harmonic uses a diode frequency doubler.

14. The method of claim 9 wherein the step of isolating uses a Savitzky-Golay filter.

15. The method of claim 10 wherein the step of estimating includes using at least one of Yule Walker equations, minimum mean square error and forward linear prediction.

* * * * *